United States Patent
Shimizu et al.

(10) Patent No.: US 10,156,443 B2
(45) Date of Patent: Dec. 18, 2018

(54) ELECTRONIC DEVICE, ELECTRONIC APPARATUS, AND MOVING OBJECT

(71) Applicant: Seiko Epson Corporation, Tokyo (JP)

(72) Inventors: Norifumi Shimizu, Matsumoto (JP); Takayuki Kikuchi, Chino (JP)

(73) Assignee: Seiko Epson Corporation (JP)

( * ) Notice: Subject to any disclaimer, the term of this patent is extended or adjusted under 35 U.S.C. 154(b) by 127 days.

(21) Appl. No.: 15/207,765

(22) Filed: Jul. 12, 2016

(65) Prior Publication Data

US 2017/0016725 A1 Jan. 19, 2017

(30) Foreign Application Priority Data

Jul. 16, 2015 (JP) .................................. 2015-141925

(51) Int. Cl.
*G01C 19/5642* (2012.01)

(52) U.S. Cl.
CPC ................................ *G01C 19/5642* (2013.01)

(58) Field of Classification Search
CPC .................................................. G01C 19/5642
See application file for complete search history.

(56) References Cited

U.S. PATENT DOCUMENTS

| 2003/0141340 | A1 | 7/2003 | Ishikawa et al. |
| 2007/0017288 | A1* | 1/2007 | Sato ................... G01C 19/5607 73/504.12 |
| 2012/0079882 | A1* | 4/2012 | Chiba ................ G01C 19/5783 73/514.29 |
| 2014/0312438 | A1* | 10/2014 | Takada .................. B81B 7/0064 257/415 |

FOREIGN PATENT DOCUMENTS

| JP | 2003-294450 A | 10/2003 |
| JP | 2006-284373 A | 10/2006 |
| JP | 2010-223763 A | 10/2010 |

* cited by examiner

*Primary Examiner* — Ryan Walsh
(74) *Attorney, Agent, or Firm* — Harness, Dickey & Pierce, P.L.C.

(57) ABSTRACT

An electronic device includes: a base; a support unit that includes first and second attaching portions disposed to be separated from each other in a first direction via a middle portion having a conductive pattern formed from a conductive member and is attached to the base in the first and second attaching portions; and a functional element that is supported by the support unit. The conductive pattern includes a broad width portion having a width W1 in a second direction orthogonal to the first direction and a narrow width portion having a width W2 narrower than the width W1 in a plan view.

20 Claims, 15 Drawing Sheets

ELECTRONIC DEVICE, ELECTRONIC APPARATUS, AND MOVING OBJECT

BACKGROUND

1. Technical Field

The present invention relates to an electronic device, an electronic apparatus, and a moving object.

2. Related Art

In the related art, electronic devices in which vibration elements which are examples of functional elements are accommodated in ceramic packages serving as bases are known. For example, in a piezoelectric device which is an example of such an electronic device and is described in JP-A-2006-284373, a support unit including a support substrate that supports a vibration element which is an example of a functional element is connected (fixed) to a ceramic package serving as a base on one end side and the other end side opposite to the one end side using an adhesive.

In the piezoelectric device disclosed in JP-A-2006-284373, however, a coefficient of thermal expansion (coefficient of linear thermal expansion) differs between the ceramic package serving as the base and the support unit connected (fixed) to the ceramic package. The support unit is also configured such that a metal wire such as copper is installed, for example. Even in this configuration, a coefficient of thermal expansion also differs between the ceramic package and the metal wire. Accordingly, due to a change in environment temperature, stress may occur in a connection (fixed) portion between the ceramic package and the support unit, and thus there is a concern that a connection strength of the connection (fixed) portion reduces (deteriorates) or the support unit is peeled from the ceramic package.

SUMMARY

An advantage of some aspects of the invention is to suppress a reduction (deterioration) in a connection strength of a connection (fixed) portion by decreasing stress occurring in the connection (fixed) portion between the ceramic package and the support unit due to a change in environment temperature.

The invention can be implemented as the following application examples.

APPLICATION EXAMPLE 1

An electronic device according to this application example includes: a base; a support unit that includes a first attaching portion and a second attaching portion disposed to be separated from each other in a first direction and a middle portion connecting the first attaching portion to the second attaching portion and that is attached to the base in the first and second attaching portions; and a functional element that is supported by the support unit. The middle portion has a conductive pattern formed from a conductive member. The conductive pattern includes a broad width portion having a width W1 in a second direction orthogonal to the first direction and a narrow width portion having a width W2 narrower than the width W1.

According to this application example, the narrow width portion included in the conductive pattern formed on the conductive member is formed between the first and second attaching portions disposed to be separated from each other in the first direction. The narrow width portion can reduce stress occurring in the first and second attaching portions in accordance with a growth occurring due to a difference in the thermal expansion coefficient or a difference in a contraction amount between the conductive pattern and the base in a case in which the environment temperature is changed. Accordingly, it is possible to suppress a reduction in the connection strength of the attaching portions (the first and second attaching portions) of the base and the support unit, and thus it is possible to provide the electronic device with high connection reliability.

APPLICATION EXAMPLE 2

In the electronic device according to the application example, it is preferable that the support unit includes a support substrate, the conductive pattern is stacked on the support substrate, and in the support substrate, at least one of a slit portion cut from an outer circumferential edge of the middle portion in the first direction and a hole formed in the middle portion is formed.

According to this application example, at least one of the slit portion and the hole formed in the middle portion of the support substrate can reduce stress occurring in the first and second attaching portions in accordance with a growth occurring due to a difference in the thermal expansion coefficient or a difference in a contraction amount between the support substrate and the base in a case in which environment temperature is changed. Accordingly, it is possible to suppress a reduction in the connection strength of the attaching portions (the first and second attaching portions) of the base and the support unit, and thus it is possible to improve connection reliability.

APPLICATION EXAMPLE 3

In the electronic device according to the application example, it is preferable that the broad width portion includes a first broad width portion that is formed on one side in the first direction via the narrow width portion and a second broad width portion that is formed on the other side.

According to this application example, since the first and second broad width portions are included in both sides of the narrow width portion, the stress occurring in expansion or contraction generated in the first and second broad width portions can be absorbed efficiently in a well-balanced manner by the narrow width portion. Accordingly, it is possible to more efficiently suppress the reduction in the connection strength of the attaching portions (the first and second attaching portions) of the base and the support unit due to the stress.

APPLICATION EXAMPLE 4

In the electronic device according to the application example, it is preferable that the conductive pattern is connected to a fixed potential.

According to this application example, for example, the conductive pattern can efficiently screen (shield) electric noise radiated from a high-frequency signal wire, a digital signal wire, or the like.

APPLICATION EXAMPLE 5

In the electronic device according to the application example, it is preferable that the functional element includes a detection electrode detecting a physical quantity, and the conductive pattern is disposed to overlap at least a part of the detection electrode in a plan view.

According to this application example, the conductive pattern disposed to overlap at least a part of the detection electrode can screen (shield) the electric noise (radiated noise) having an influence on a detection value of a physical quantity detected by the detection electrode, and thus can reduce the influence. Accordingly, it is possible to further improve detection precision of the physical quantity.

APPLICATION EXAMPLE 6

In the electronic device according to the application example, it is preferable that the functional element is a gyro element including a detection electrode detecting an angular velocity, and the conductive pattern is disposed to overlap at least apart of the detection electrode in a plan view.

According to this application example, the conductive pattern disposed to overlap at least a part of the detection electrode can screen (shield) the electric noise (radiated noise) having an influence on a detection value of an angular velocity detected by the detection electrode, and thus can reduce the influence. Accordingly, it is possible to provide the gyro sensor with improved detection precision of the angular velocity.

APPLICATION EXAMPLE 7

In the electronic device according to the application example, it is preferable that the conductive pattern includes a protrusion overhanging from the support substrate in the second direction in a plan view.

According to this application example, since the area of the conductive pattern is increased by the protrusion overhanging from the support substrate in the second direction, it is possible to further improve a screening effect (shielding effect) of the electric noise (radiated noise).

Since the conductive pattern is formed of metal, for example, it is possible to screen light such as ultraviolet rays or laser light.

APPLICATION EXAMPLE 8

An electronic device according to this application example includes: a base; a support unit that includes first and second attaching portions disposed to be separated from each other in a first direction via a middle portion having a conductive pattern formed from a conductive member and is attached to the base in the first and second attaching portions; and a functional element that is supported by the support unit. The conductive pattern includes a first conductive pattern and a second conductive pattern separated from the first conductive pattern. The first and second conductive patterns are disposed to be arranged in the first direction.

According to this application example, the conductive pattern formed between the first and second attaching portions disposed to be separated from each other in the first direction is split into first and second conductive patterns. Accordingly, stress occurring due to deformation of the conductive pattern with a large thermal expansion coefficient in a case in which the environment temperature is changed is absorbed by the split portions of the first and second conductive patterns, and thus the stress occurring in the first and second attaching portions can be reduced. Accordingly, it is possible to suppress the reduction in the connection strength of the attaching portions (the first and second attaching portions) of the base and the support unit, and thus it is possible to provide the electronic device with high connection reliability.

APPLICATION EXAMPLE 9

An electronic apparatus according to this application example includes the electronic device according to the application example.

According to this application example, since the electronic apparatus includes the electronic device suppressing the reduction in the connection strength of the attaching portions of the base and the support unit, the electronic apparatus with high reliability can be obtained.

APPLICATION EXAMPLE 10

A moving object according to this application example includes the electronic device according to the application example.

According to this application example, since the moving object includes the electronic device suppressing the reduction in the connection strength of the attaching portions of the base and the support unit, the moving object with high reliability can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an electronic device, an electronic apparatus using an electronic device, and a moving object using the electronic device according to the invention will be described in detail according to preferred embodiments illustrated in the appended drawings.

1. Electronic Device

FIRST EMBODIMENT

Figure 1:
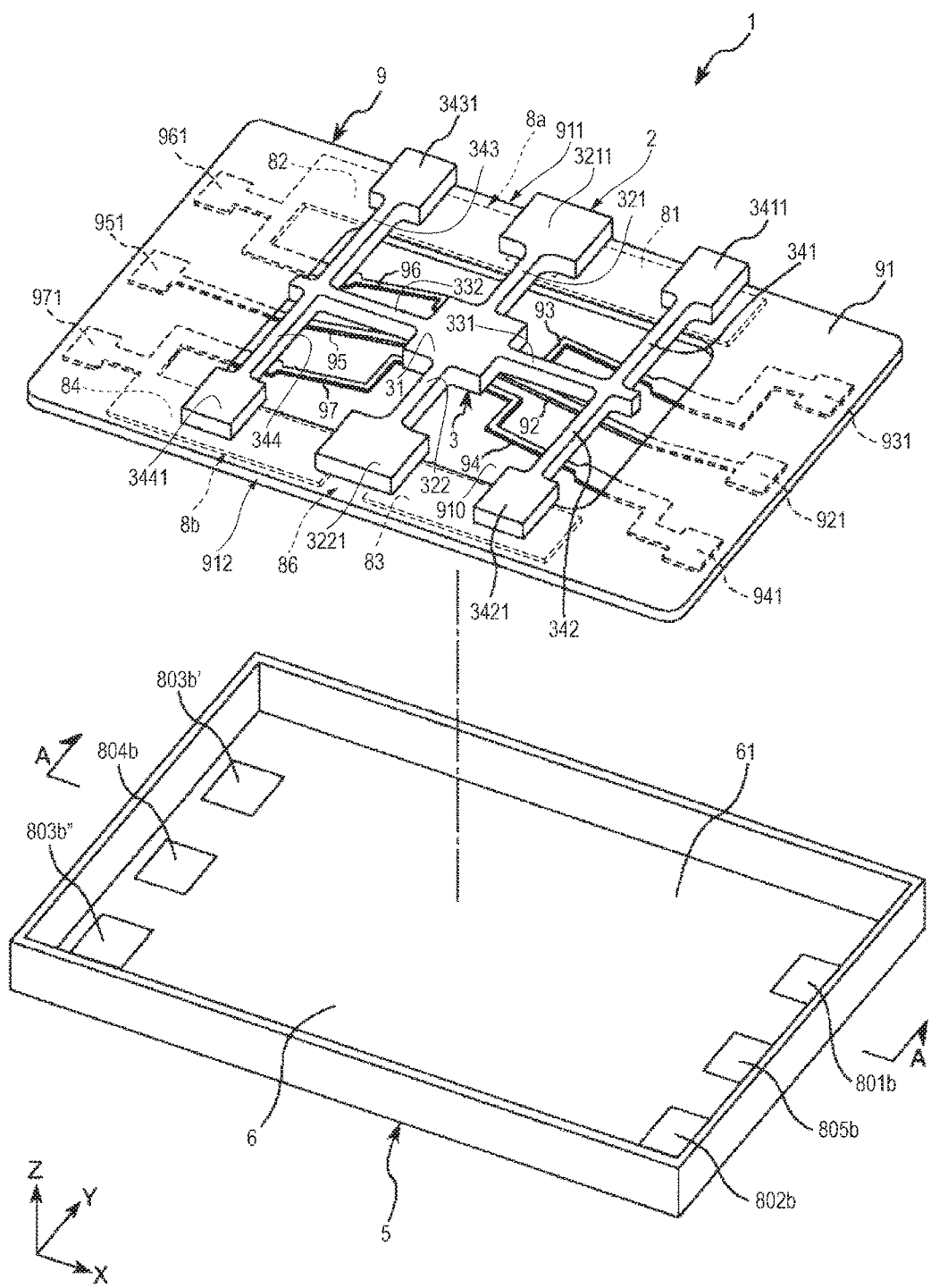
FIG. 1 is an exploded perspective view illustrating a gyro sensor exemplified as an electronic device according to the invention according to a first embodiment.
Figure 2:
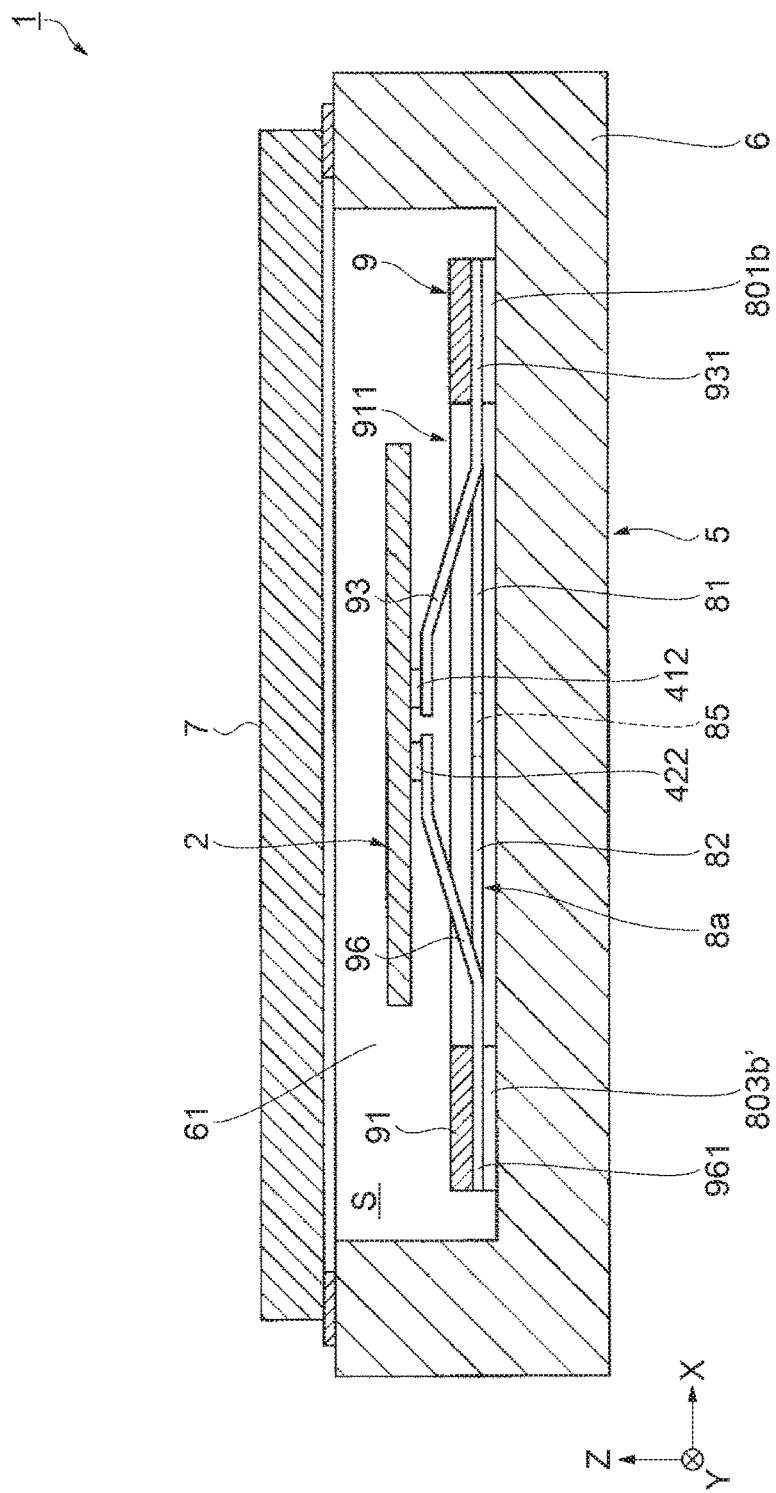
FIG. 2 is a sectional view taken along the line A-A of FIG. 1.
Figure 3:
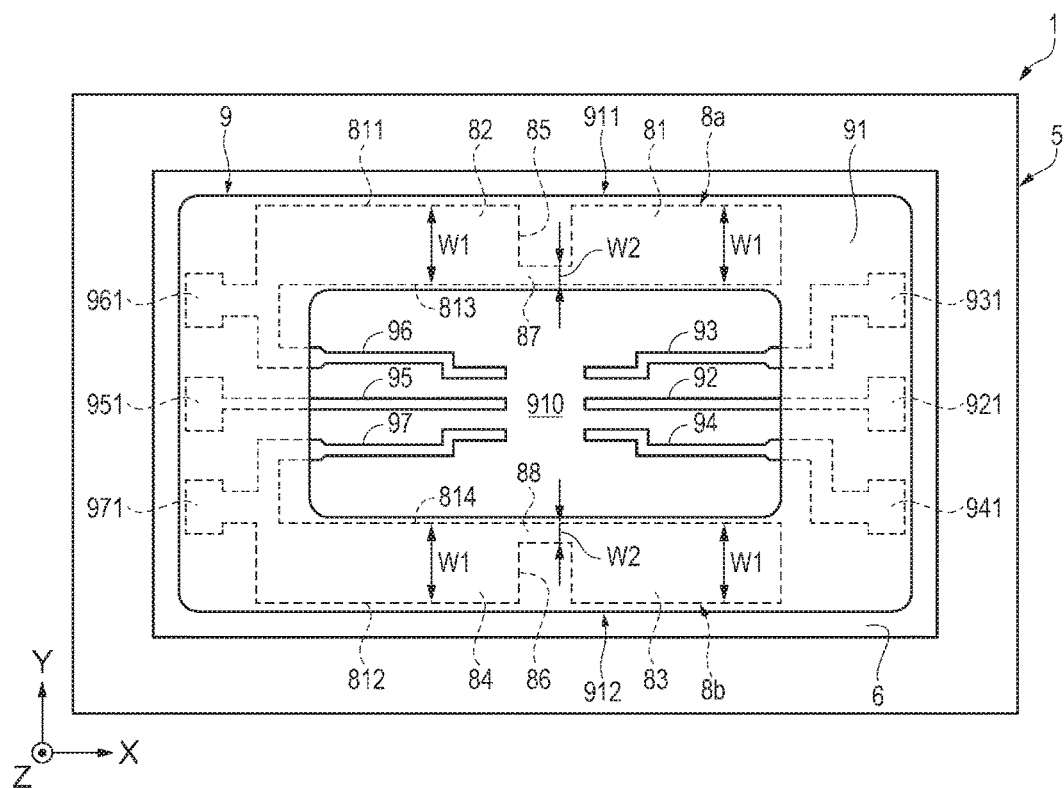
FIG. 3 is a plan view (top view) illustrating the gyro sensor illustrated in FIG. 1.
Figure 4:
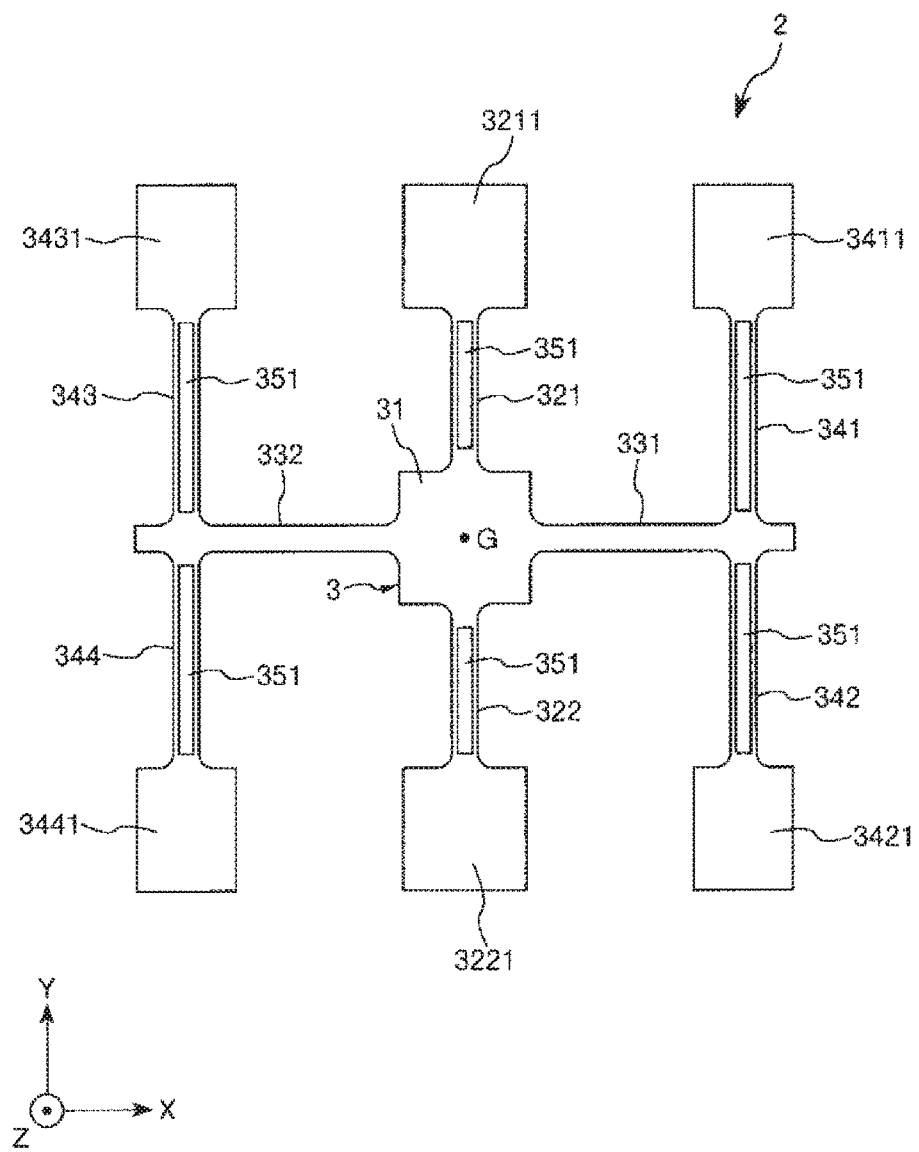
FIG. 4 is a plan view (top view) illustrating the gyro element serving as a functional element.
Figure 5:
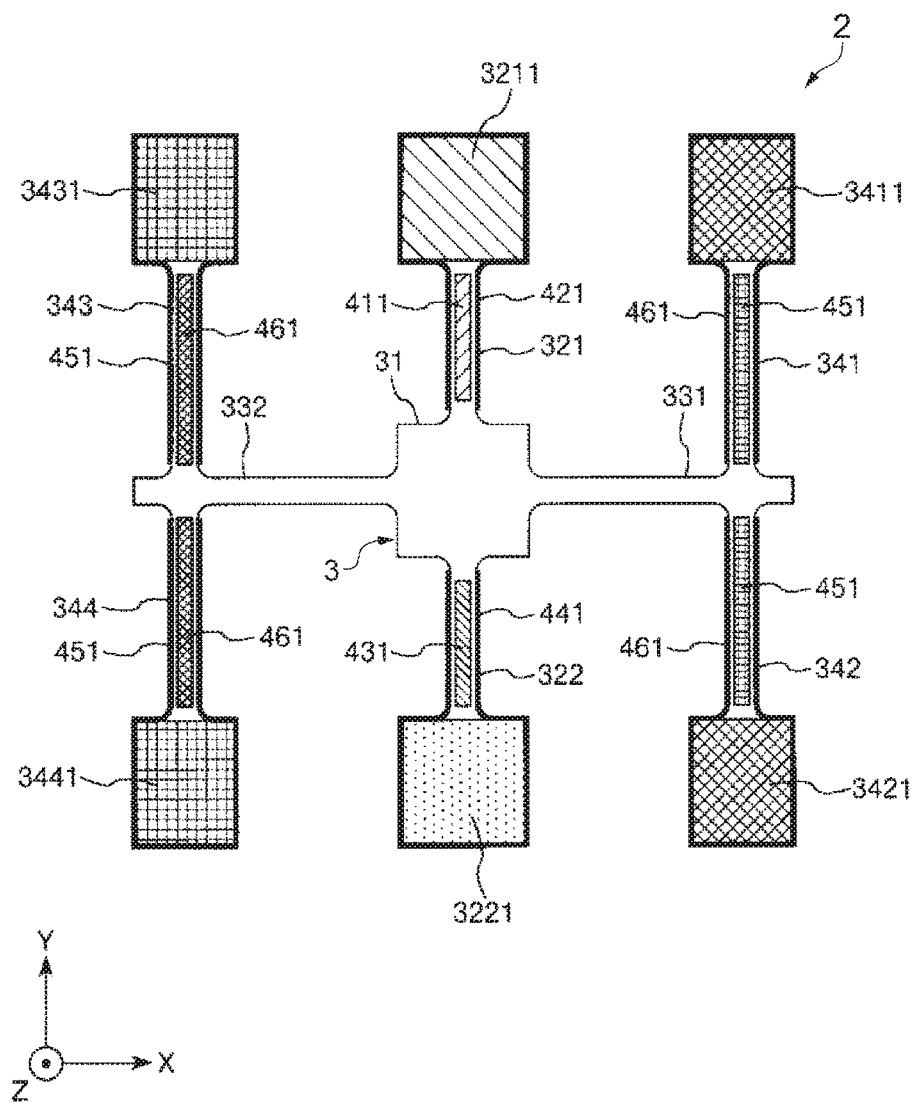
FIG. 5 is a plan view (top view) illustrating electrode arrangement of the gyro element.
Figure 6:
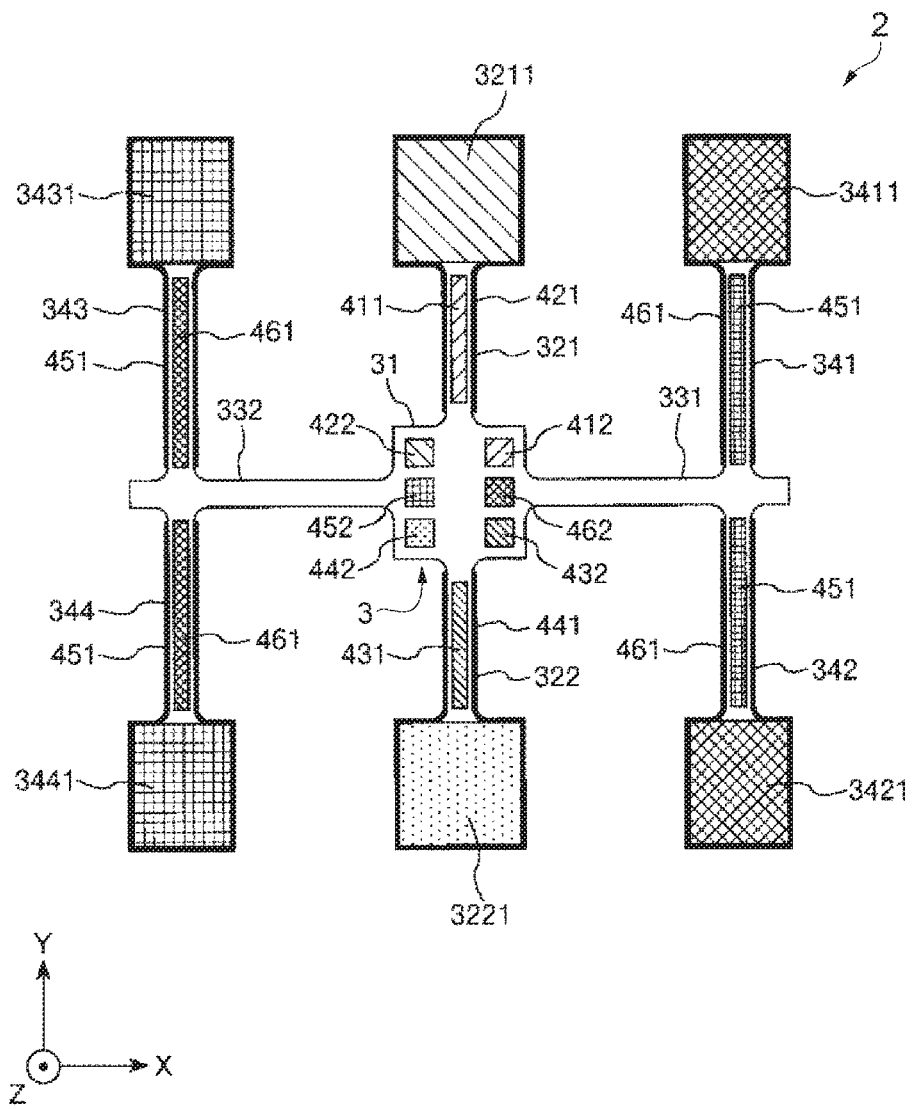
FIG. 6 is a plan view (transmission view when viewed from the upper side) illustrating the electrode arrangement of the gyro element.
Figure 7:
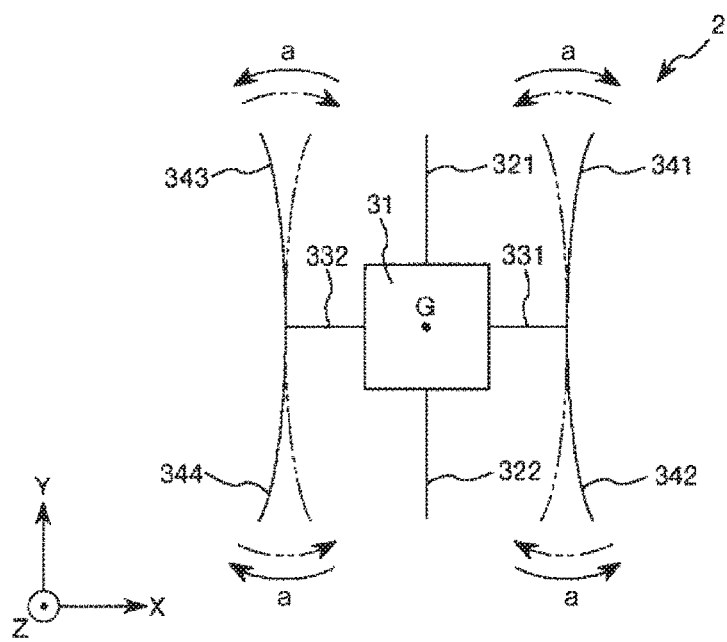
FIG. 7 is a schematic view illustrating an operation of the gyro element.
Figure 8:
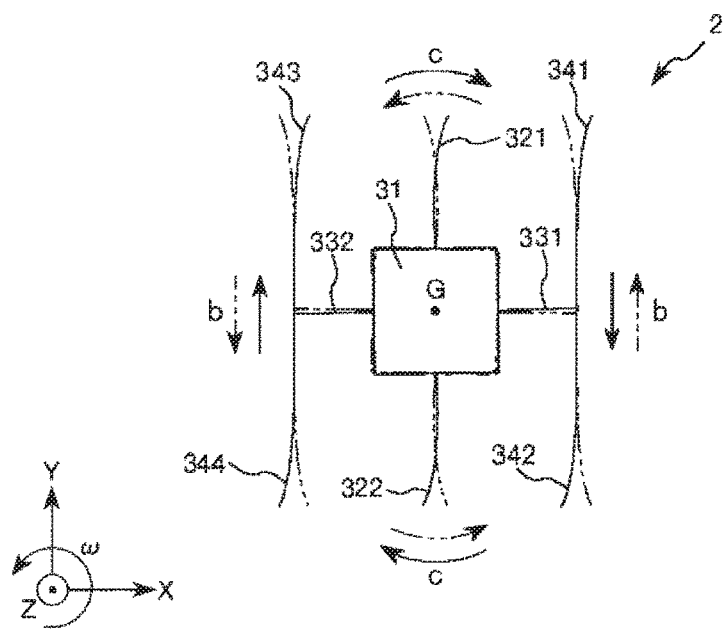
FIG. 8 is a schematic view illustrating an operation of the gyro element.

First, the configuration of a gyro sensor exemplified as an electronic device according to the invention and a method of manufacturing the gyro sensor according to a first embodiment will be described with reference to FIGS. 1 to 8. FIG. 1 is an exploded perspective view illustrating the gyro sensor exemplified as an electronic device according to the invention. FIG. 2 is a sectional view illustrating the cross section of the gyro sensor and taken along the line A-A of FIG. 1. FIG. 3 is a plan view (top view) illustrating the gyro sensor illustrated in FIG. 1. In FIG. 3, to facilitate viewing, the gyro element is omitted. FIG. 4 is a plan view illustrating the gyro element illustrated in FIG. 1. FIG. 5 is a plan view (top view) illustrating electrode arrangement of the gyro element illustrated in FIG. 1. FIG. 6 is a plan view (transmission view when viewed from the upper side) illustrating the electrode arrangement of the gyro element illustrated in FIG. 1. FIGS. 7 and 8 are schematic views illustrating an operation of the gyro element illustrated in FIG. 1.

Hereinafter, in each drawing, X, Y, and Z axes are illustrated as three axes perpendicular to each other in the drawings to facilitate the description. A direction parallel to the X axis is referred to as "a first direction or an X axis direction", a direction parallel to the Y axis is referred to as "a second direction or a Y axis direction", and a direction parallel to the Z axis is referred to as "a Z axis direction". The +Z axis side is also referred to as "upper" and the −Z axis side is also referred to as "lower".

A gyro sensor (physical quantity sensor) 1 which is an example of an electronic device illustrated in FIGS. 1, 2, and 3 includes a gyro element 2 that functions as a functional element detecting an angular velocity, a support unit 9 that supports the gyro element 2, and a package 5 that collectively accommodates the gyro element 2 and the support unit 9. As will be described below, the package 5 includes a base (substrate) 6 and a lid (lid body) 7 joined with the base 6. Hereinafter, constituent elements will be described in sequence.

Gyro Element

As illustrated in FIGS. 4 to 6, the gyro element 2 functioning as a functional element includes a vibration element 3 and electrodes formed in the vibration element 3.

Vibration Element

As a material of which the vibration element 3 is formed, for example, a piezoelectric material such as quartz crystal, lithium tantalate, or lithium niobate is exemplified. Of the materials, quartz crystal is preferably used as the material of which the vibration element 3 is formed. By using quartz crystal, it is possible to obtain the gyro element 2 with more excellent frequency temperature characteristics than other materials. Hereinafter, a case in which the vibration element 3 is formed of quartz crystal will be described.

The vibration element 3 is configured as a so-called Z-cut quartz crystal substrate that has an expanse on the XY plane defined by a Y axis (mechanical axis) and an X axis (electric axis) which are crystalline axes of the quartz crystal substrate and is formed in a plate shape having a thickness in the Z axis (optical axis). The Z axis is preferably identical to the thickness direction of the vibration element 3, but may be slightly inclined (for example, $-5° \leq \theta \leq 15°$) with respect to the thickness direction from the viewpoint of decreasing a frequency temperature change near the room temperature.

The vibration element 3 includes a base portion 31 that is located at a center portion, a first detection arm 321 and a second detection arm 322 that extend from the base portion 31 on both sides in the Y axis direction, a first connection arm 331 and a second connection arm 332 that extend from the base portion 31 on both sides in the X axis direction, a first driving arm 341 and a second driving arm 342 that extend from the front ends of the first connection arm 331 on both sides in the Y axis direction, and a third driving arm 343 and a fourth driving arm 344 that extend from the front ends of the second connection arm 332 on both sides in the Y axis direction.

The first detection arm 321 extends from the base portion 31 in the +Y axis direction and a hammer head 3211 having a large width is formed at the front end. On the other hand, the second detection arm 322 extends from the base portion 31 in the −Y axis direction and a hammer head 3221 having a large width is formed at the front end. The first detection arm 321 and the second detection arm 322 are disposed to be plane-symmetric with respect to the XZ plane passing through a centroid G of the gyro element 2. The hammer heads 3211 and 3221 may be formed as necessary, or may be omitted. Bottomed grooves extending in the lengthwise direction (longitudinal direction) may be formed on the upper and lower surfaces of the first detection arm 321 and the second detection arm 322, as necessary.

The first connection arm 331 extends from the base portion 31 in the +X axis direction. On the other hand, the second connection arm 332 extends from the base portion 31 in the −X axis direction. The first connection arm 331 and the second connection arm 332 are disposed to be plane-symmetric with respect to the YZ plane passing through the centroid G.

The first driving arm 341 extends from the front end of the first connection arm 331 in the +Y axis direction and a hammer head 3411 having a large width is formed at the front end. The second driving arm 342 extends from the front end of the first connection arm 331 in the −Y axis direction and a hammer head 3421 having a large width is formed at the front end. The third driving arm 343 extends from the front end of the second connection arm 332 in the +Y axis direction and a hammer head 3431 having a large width is formed at the front end. The fourth driving arm 344 extends from the front end of the second connection arm 332 in the −Y axis direction and a hammer head 3441 having a large width is formed at the front end. The first driving arm 341, the second driving arm 342, the third driving arm 343, and the fourth driving arm 344 are disposed to be point-symmetric with respect to the centroid G. The hammer heads 3411, 3421, 3431, and 3441 may be formed as necessary or may be omitted.

Bottomed grooves 351 extending in the lengthwise direction (longitudinal direction) are formed on the upper and lower surfaces of the first detection arm 321, the second detection arm 322, the first driving arm 341, the second driving arm 342, the third driving arm 343, and the fourth driving arm 344. Therefore, the first detection arm 321, the second detection arm 322, the first driving arm 341, the second driving arm 342, the third driving arm 343, and the fourth driving arm 344 have the cross-sectional shape formed in an "H" shape across the entire lengths of portions in the longitudinal direction excluding weight portions (the hammer heads 3211, 3221, 3411, 3421, 3431, and 3441). Accordingly, gaps between the electrodes formed in the arms in the X axis direction are narrowed. Accordingly, electric field efficiency between the electrodes is improved. As a result, the first detection arm 321, the second detection arm 322, the first driving arm 341, the second driving arm 342, the third driving arm 343, and the fourth driving arm 344 can generate a relatively large charge amount with a relatively small distortion amount. Accordingly, it is possible to obtain the gyro element 2 having excellent sensitivity.

Electrodes

As illustrated in FIGS. 5 and 6, the vibration element 3 includes, as electrodes, a first detection signal electrode 411, a first detection signal terminal 412, a first detection ground electrode (detection ground electrode) 421, a first detection ground terminal 422, a second detection signal electrode 431, a second detection signal terminal 432, a second detection ground electrode (detection ground electrode) 441, a second detection ground terminal 442, a driving signal electrode 451, a driving signal terminal 452, a driving ground electrode 461, and a driving ground terminal 462. In FIGS. 5 and 6, to facilitate the description, the first detection signal electrode 411 and the second detection signal electrode 431, and the first detection signal terminal 412 and the second detection signal terminal 432; the first detection ground electrode 421 and the second detection ground electrode 441, and the first detection ground terminal 422 and the second detection ground terminal 442; the driving signal electrode 451 and the driving signal terminal 452; and the driving ground electrode 461 and the driving ground terminal 462 are indicated by different hatchings. The electrodes formed on the side surfaces of the vibration element 3 are indicated by thick lines.

The first detection signal electrode 411 is formed on the upper and lower surfaces (portions excluding the hammer head 3211) of the first detection arm 321 and the second detection signal electrode 431 is formed on the upper and lower surfaces (portions excluding the hammer head 3221) of the second detection arm 322. The first detection signal electrode 411 and the second detection signal electrode 431 are electrodes that detect charges generated through detection vibration when the detection vibration of the first detection arm 321 and the second detection arm 322 are excited.

The first detection signal terminal 412 is formed on the +Y axis side of a column and on the +X axis side of the base portion 31 and is electrically connected to the first detection signal electrode 411 formed in the first detection arm 321 via a wire (not illustrated). The second detection signal terminal 432 is formed on the −Y axis side of a column on the +X axis side of the base portion 31 and is electrically connected to the second detection signal electrode 431 formed in the second detection arm 322 via a wire (not illustrated).

The first detection ground electrode 421 is formed on both side surfaces of the first detection arm 321 and is electrically connected via the hammer head 3211. Similarly, the second detection ground electrode 441 is formed on both side surfaces of the second detection arm 322 and is electrically connected via the hammer head 3221. The first detection ground electrode 421 and the second detection ground electrode 441 have potentials which are grounds for the first detection signal electrode 411 and the second detection signal electrode 431.

The first detection ground terminal 422 is formed on the +Y axis side of a column and on the −X axis side of the base portion 31 and is electrically connected to the first detection ground electrode 421 formed in the first detection arm 321 via a wire (not illustrated). The second detection ground terminal 442 is formed on the −Y axis side of a column on the −X axis side of the base portion 31 and is electrically connected to the second detection signal electrode 431 formed in the second detection arm 322 via a wire (not illustrated).

Thus, by disposing the first detection signal electrode 411 and the second detection signal electrode 431, the first detection signal terminal 412 and the second detection signal terminal 432, the first detection ground electrode 421 and the second detection ground electrode 441, and the first detection ground terminal 422 and the second detection ground terminal 442, detection vibration generated in the first detection arm 321 appears as charges between the first detection signal electrode 411 and the first detection ground electrode 421, and thus can be extracted as a signal (detection signal) from the first detection signal terminal 412 and the first detection ground terminal 422. Further, detection vibration generated in the second detection arm 322 appears as charges between the second detection signal electrode 431 and the second detection ground electrode 441, and thus can be extracted as a signal (detection signal) from the second detection signal terminal 432 and the second detection ground terminal 442.

The driving signal electrodes 451 are formed in the upper and lower surfaces (portions excluding the hammer heads 3411 and 3421) of the first driving arm 341 and the second driving arm 342. Further, the driving signal electrodes 451 are formed on both side surfaces of the third driving arm 343 and the fourth driving arm 344 and are electrically connected via the hammer heads 3431 and 3441. The driving signal electrodes 451 are electrodes that excite driving vibration of the first driving arm 341, the second driving arm 342, the third driving arm 343, and the fourth driving arm 344.

The driving signal terminal 452 is formed in the middle of the column on the −X axis side (that is, between the first detection ground terminal 422 and the second detection ground terminal 442) in the base portion 31 and is electrically connected to the driving signal electrodes 451 formed in the first driving arm 341, the second driving arm 342, the third driving arm 343, and the fourth driving arm 344 via wires (not illustrated).

The driving ground electrodes 461 are formed on the upper and lower surfaces (portions excluding the hammer heads 3431 and 3441) of the third driving arm 343 and the fourth driving arm 344. The driving ground electrodes 461 are formed on both sides of the first driving arm 341 and the second driving arm 342 and are electrically connected via the hammer heads 3411 and 3421. The driving ground electrode 461 has a potential which is a ground of the driving signal electrode 451.

The driving ground terminal 462 is formed in the middle of the column on the +X axis side (that is, between the first detection signal terminal 412 and the second detection signal terminal 432) in the base portion 31 and is electrically connected to the driving ground electrodes 461 formed in the first driving arm 341, the second driving arm 342, the third driving arm 343, and the fourth driving arm 344 via wires (not illustrated).

Thus, the driving signal electrodes 451, the driving signal terminal 452, the driving ground electrodes 461, and the driving ground terminal 462 are disposed. Thus, by applying driving signals between the driving signal terminals 452 and the driving ground terminals 462 and generating electric fields between the driving signal electrodes 451 and the driving ground electrodes 461 formed in the first driving arm 341, the second driving arm 342, the third driving arm 343, and the fourth driving arm 344, the first driving arm 341, the second driving arm 342, the third driving arm 343, and the fourth driving arm 344 can be driven and vibrated.

Such a configuration of the electrodes is not particularly limited as long as the electrodes have conductivity. For example, metal coating films formed by stacking coating films of nickel (Ni), gold (Au), silver (Ag), copper (Cu), or the like on metalized layers (underlying layers) of chromium (Cr), tungsten (W), or the like are used.

The metal films formed on the hammer heads 3211 and 3221 function as adjustment films that adjust a frequency of a detection vibration mode. For example, by removing parts of the metal films by laser irradiation or the like to adjust the masses of the first detection arm 321 and the second detection arm 322, it is possible to adjust the frequency of a detection mode. On the other hand, the metal films formed on the hammer heads 3411, 3421, 3431, and 3441 function as adjustment films that adjust a frequency of a driving vibration mode. For example, by removing parts of the metal films by laser irradiation or the like to adjust the masses of the first driving arm 341, the second driving arm 342, the third driving arm 343, and the fourth driving arm 344, it is possible to adjust a frequency of a driving mode.

The configuration of the gyro element 2 has been described in brief above. Next, driving of the gyro element 2 will be described in brief with reference to FIGS. 7 and 8.

When a voltage (alternating voltage) is applied between the driving signal terminal 452 and the driving ground terminal 462 in a state in which no angular velocity is applied to the gyro element 2, electric fields are generated between the driving signal electrodes 451 and the driving ground electrodes 461. As illustrated in FIG. 7, the driving arms 341, 342, 343, and 344 perform flexural vibration in directions indicated by arrows a. At this time, since the first driving arm 341, the second driving arm 342, the third driving arm 343, and the fourth driving arm 344 perform plane-symmetric vibration with respect to the YZ plane passing through the centroid G of the gyro element 2, the base portion 31, the first detection arm 321, the second detection arm 322, the first connection arm 331, and the second connection arm 332 are rarely vibrated.

When an angular velocity ω around the Z axis is applied to the gyro element 2 in the state in which such driving vibration is performed, detection vibration is excited, as illustrated in FIG. 8. Specifically, Coriolis forces in directions of arrows b are operated to the driving arms 341, 342, 343, and 344, the first connection arm 331, and the second connection arm 332, and thus new vibration is excited. The vibration in the directions of the arrows b is vibration in a circumferential direction with respect to the centroid G. Simultaneously, in the first detection arm 321 and the second detection arm 322, detection vibration in directions of arrows c is excited in response to the vibration in the directions of the arrows b. Then, charges generated in the first detection arm 321 and the second detection arm 322 by this vibration are extracted as signals from the first detection signal electrode 411 and the second detection signal electrode 431, and the first detection ground electrode 421 and the second detection ground electrode 441. The angular velocity ω is obtained based on the signals.

Support Unit

Next, referring back to FIGS. 1 to 3, the configuration of the support unit 9 will be described. The support unit 9 is a tape automated bonding (TAB) mounting substrate with optical transparency known in the related art and supports the gyro element 2. The support unit 9 includes a substrate (support substrate) 91 with a frame shape, six support leads 92, 93, 94, 95, 96, and 97 (also referred to as bonding leads (wire)) formed in the substrate 91, and shield portions 8a and 8b serving as conductive patterns.

The substrate 91 serving as a support substrate is formed of, for example, a resin with flexibility, such as polyimide. The substrate 91 has a substantially oblong exterior form formed in a frame shape including an opening 910 in the middle and is disposed inside a concave portion 61 so that the major axis of the substrate 91 is identical to the major axis of the package 5. The substrate 91 includes two middle portions 911 and 912 facing each other in an elongate direction (in the X axis direction in the drawing) of the substrate 91.

The six support leads 92 to 97 are bonding leads (wires) that support the gyro element 2 and are wire patterns configured by conductive members with conductivity. In the embodiment, for example, a metal material such as copper (Cu) or a copper alloy is used as the conductive member. The six support leads 92 to 97 are fixed to the lower surface of the substrate 91. The support leads 92, 93, and 94 are disposed in portions on the right side of the substrate 91 in FIG. 3 (one side in the X axis direction which is the major axis direction) and the front ends of these support leads extend up to the opening 910 of the substrate 91. On the other hand, the support leads 95, 96, and 97 are disposed in portions on the left side of the substrate 91 in FIG. 3 (the other side in the X axis direction which is the major axis direction) and the front ends of these support leads extend up to the opening 910 of the substrate 91. The front ends of the support leads 92, 93, and 94 and the front ends of the support leads 95, 96, and 97 are separated to face each other in the middle of the opening 910.

The support leads 92 to 97 are inclined halfway and the front ends of the support leads are located on the upper side (in the +Z axis direction) of the substrate 91. The support leads 92 to 97 are tapered in width halfway, and thus the front ends are more slender than base portions of the support leads. The front ends of the support leads 92 to 97 are disposed to correspond to (overlap) the first detection signal terminal 412, the first detection ground terminal 422, the second detection signal terminal 432, the second detection ground terminal 442, the driving signal terminal 452, and the driving ground terminal 462 included in the gyro element 2.

The base ends of the support leads 92 and 95 serve as connection terminals 921 and 951. Thus, the support leads 92 and 95 straightly extend from the connection terminals 921 and 951. On the other hand, the base ends of the support leads 93, 94, 96, and 97 serve as connection terminals 931, 941, 961, and 971. Thus, the support leads 93, 94, 96, and 97 extend while being flexural at the right angles from the connection terminals 931, 941, 961, and 971 to the support leads 92 and 95.

The connection terminals 921 and 951 and the connection terminals 931, 941, 961, and 971 correspond to an S1 connection terminal 801b, an S2 connection terminal 802b, GND connection terminals 803b' and 803b", a DS connection terminal 804b, and a DG connection terminal 805b formed on the upper surface of the base 6 of the package 5 to be described below and are attaching portions (connection portions) to be connected, respectively. Specifically, the attaching portions include a first attaching portion including the connection terminals 921, 931, and 941 located on the right side (in the +X axis direction) in FIG. 3 and a second attaching portion including the connection terminals 951, 961, and 971 located on the left side (−X axis direction) of the other side in FIG. 3. The first and second attaching portions are connected by the middle portions 911 and 912.

The shield portions 8a and 8b serving as conductive patterns are formed to extend from the connection terminals 961 and 971. The shield portions 8a and 8b are conductive patterns with a thin plate shape formed of a conductive member with conductivity, as in the connection terminals 961 and 971. In the embodiment, for example, a metal material such as copper (Cu) or a copper alloy is used as the conductive member. The shield portions 8a and 8b are stacked (fixed) on the lower surfaces of the middle portions 911 and 912 located on both sides in the Y axis direction between the first and second attaching portions in the substrate 91 with the frame shape included in the support unit 9. As a material of which the shield portions 8a and 8b, for example, a carbon material can also be used as well as the above-described material.

Specifically, the shield portion 8a is formed to extend from the connection terminal 961 to substantially imitate the planar shape of the middle portion 911 and is stacked (fixed) on the rear surface of the middle portion 911. The shield portion 8a includes a first broad width portion 81 and a second broad width portion 82 that are broad width portions with a width W1 which is a width dimension (dimension in the Y axis direction) which is substantially the same as the width (a distance between an outer edge 811 and an inner circumferential edge 813) of the middle portion 911; and a narrow width portion 87 that is located between the first broad width portion 81 and the second broad width portion 82 and has a width W2 (a distance between the bottom portion of a concave portion 85 and the inner circumferential edge 813) which is narrowed in the width dimension (the dimension in the Y axis direction) by the concave portion 85 serving as a slit portion cut from the outer edge 811 of the shield portion 8a. In other words, the broad width portion includes the first broad width portion 81 formed on one side in a first direction (X axis direction) via the narrow width portion 87 and the second broad width portion 82 formed on the other side.

Here, the connection terminals 961 and 971 formed by extending the shield portions 8a and 8b correspond to the GND connection terminals 803b' and 803b" formed on the upper surface of the base 6 of the package 5. That is, the shield portions 8a and 8b have fixed potentials connected to the GND. Thus, by causing the shield portions 8a and 8b to have the fixed potentials, for example, it is possible to effectively screen (shield) electric noise radiated from a high-frequency signal wire through which a high frequency signal flows or a digital signal wire through which a digital signal flows to the first detection signal electrode 411 and the second detection signal electrode 431 serving as detection electrodes of the vibration element 3. The shield portions 8a and 8b may not necessarily have the fixed potential connected to the GND and may have fixed potentials electrically connected to a constant potential source in which a potential is constantly maintained, so that the shielding effect can be obtained.

Specifically, the shield portion 8b is formed to extend from the connection terminal 971 to substantially imitate the planar shape of the middle portion 912 and is fixed to the rear surface of the middle portion 912. The shield portion 8b includes a first broad width portion 83 and a second broad width portion 84 that are broad width portions with the width W1 which is a width dimension (dimension in the Y axis direction) which is substantially the same as the width (a distance between an outer edge 812 and an inner circumferential edge 814) of the middle portion 912; and a narrow width portion 88 that is located between the first broad width portion 83 and the second broad width portion 84 and has the width W2 (a distance between the bottom portion of a concave portion 86 and the inner circumferential edge 814) which is narrowed in the width dimension (the dimension in the Y axis direction) by the concave portion 86 serving as a slit portion engraved from the outer edge 812 of the shield portion 8b. In other words, the broad width portion includes the first broad width portion 83 formed on one side in a first direction (X axis direction) via the narrow width portion 88 and the second broad width portion 84 formed on the other side.

Thus, since the first broad width portions 81 and 83 and the second broad width portions 82 and 84 are formed on both sides of the narrow width portions 87 and 88, stress occurring in expansion or contraction resulting from a thermal change or the like occurring in the first broad width portions 81 and 83 and the second broad width portions 82 and 84 can be absorbed by the narrow width portions 87 and 88 efficiently in a well-balanced manner. Accordingly, it is possible to efficiently suppress deterioration in connection strength of the connection terminals 921, 931, and 941 (the first attaching portion) and the connection terminals 951, 961, and 971 (the second attaching portion) which are attaching portions of the base 6 and the support unit 9 caused due to the stress.

The shield portions 8a and 8b are preferably disposed to overlap at least parts of the first detection signal electrode 411 and the second detection signal electrode 431 (see FIG. 5) serving as detection electrodes formed in the gyro element 2 in a plan view when viewed from the upper side of the drawing. Thus, by disposing the shield portions 8a and 8b, it is possible to screen (shield) electric noise (radiated noise) which has an influence on a detection value of a physical quantity detected by the first detection signal electrode 411 and the second detection signal electrode 431 serving as the detection electrodes, and it is possible to reduce the influence of the electric noise.

As described above, the support unit 9 includes the frame-shaped substrate 91, the support leads 92, 93, and 94 and the support leads 95, 96, and 97 that are fixed to frame portions of the substrate 91 facing each other in the X axis direction in the drawing so that three leads are fixed for each frame portion, and the shield portions 8a and 8b that are fixed to the middle portions 911 and 912 which are frame portions of the substrate 91 facing each other in the Y axis direction in the drawing. In other words, the support unit 9 includes the connection terminals 921, 931, an 941 serving as the first attaching portion formed to be separated in the X axis direction which is the first direction via the middle portions 911 and 912 in which the shield portions 8a and 8b are fixed to the lower surface and the connection terminals 951, 961, and 971 serving as the second attaching portion. The support unit 9 is attached to the base 6 of the package 5 to be described below in portions of the connection terminals 921, 931, and 941 serving as the first attaching portion and the connection terminals 951, 961, and 971 serving as the second attaching portion.

Package

The package 5 includes the box-like base (substrate) 6 that includes the concave portion 61 opened to the upper surface and the plate-shaped lid (lid body) 7 that covers the openness of the concave portion 61 and is joined to the base 6. The above-described gyro element 2 is accommodated in an inner space S formed by covering the openness of the concave portion 61 with the lid 7. The atmosphere of the inner space S is not particularly limited. In the embodiment, the inner space S is in a vacuum state (for example, a depressurized state of 10 Pa or less).

The base 6 has a substantially oblong (rectangular) exterior shape in the plan view and includes a pair of outer edges extending in the major axis direction and a pair of outer edges extending in the minor axis direction (which is a direction intersecting the major axis direction). The shape of the base 6 in the plan view is not limited to the oblong shape, but may be square, polygonal such as pentagonal, or heteromorphic. As a material of which the base 6 is formed, ceramics can be appropriately used. As another material of which the base 6 is formed, for example, a printed circuit board (PCB) in which a resin substrate such as an epoxy substrate is used as a base can be used.

The S1 connection terminal 801b, the S2 connection terminal 802b, the GND connection terminals 803b' and 803b'', the DS connection terminal 804b, and the DG connection terminal 805b are formed to be separated from each other on the upper surface (the bottom surface of the concave portion 61) of the base 6. When the support unit 9 is accommodated in the package 5, the S1 connection terminal 801b, the S2 connection terminal 802b, the GND connection terminals 803b' and 803b'', the DS connection terminal 804b, and the DG connection terminal 805b are formed to correspond to (overlap) the connection terminals 921 to 941 and the connection terminals 951 to 971 of the support leads 92 to 94 and the support leads 95 to 97 and are respectively joined.

The S1 connection terminal 801b is joined with the connection terminal 931 and the S2 connection terminal 802b is joined with the connection terminal 941. The GND connection terminal 803b' is joined with the connection terminal 961 and the GND connection terminal 803b'' is joined with the connection terminal 971. The DS connection terminal 804b is joined with the connection terminal 951 and the DG connection terminal 805b is joined with the connection terminal 921.

In the base 6, through electrodes (not illustrated) are formed in portions corresponding to the connection terminals 801b, 802b, 803b', 803b'', 804b, and 805b and are connected to external terminals (not illustrated) formed on the lower surface of the base 6. Accordingly, the electrodes of the gyro element 2 can be electrically connected to the outside.

The ceramics forming the packages 5 and the substrate (support substrate) 91 included in the support unit 9 and the shield portions 8a and 8b or the support leads 92 to 97 fixed to the substrate 91 are different in thermal expansion coefficient (linear expansion coefficient). A representative thermal expansion coefficient (linear expansion coefficient) of the polyimide resin (polyimide film) forming the substrate is, for example, $27 \times 10^{-6}/°$ C. The thermal expansion coefficient (linear expansion coefficient) of copper (Cu) forming the shield portions 8a and 8b or the support leads 92 to 97 is, for example, $16.8 \times 10^{-6}/°$ C. A representative thermal expansion coefficient (linear expansion coefficient) of the ceramics forming the package 5 is, for example, $7.1 \times 10^{-6}/°$ C.

Here, the polyimide resin (polyimide film) forming the substrate 91 is a substrate with flexibility and easily absorbs stress occurring in expansion or contraction resulting from a change in environment temperature. In contrast, copper (Cu) of the metal material forming the shield portions 8a and 8b and the support leads 92 to 97 and the ceramics forming the package 5 have high rigidity, rarely absorb stress occurring in expansion or contraction resulting from a change in environment temperature, and are easily affected by the stress.

In particular, in the configuration in which the package 5 and the support unit 9 are attached on both sides of the connection terminals 921, 931, and 941 serving as the first attaching portion and the connection terminals 951, 961, and 971 serving as the second attaching portion as in the embodiment, the stress occurring in expansion or contraction resulting from a change in environment temperature between the connection terminals 921, 931, and 941 and the connection terminals 951, 961, and 971 is applied mainly on the connection portions.

Accordingly, in the configuration of the gyro sensor 1 according to the embodiment, the narrow width portions 87 and 88 are formed in the shield portions 8a and 8b located between the connection terminals 921, 931, and 941 and the connection terminals 951, 961, and 971. Since the narrow width portions 87 and 88 are formed with the narrow width dimension (the width W2), the rigidity can be weak, and it is possible to absorb stress occurring due to a difference in an expansion or contraction amount of each member in accordance with a change in environment temperature. Accordingly, it is possible to suppress a reduction in connection strength of the attaching portions (the connection terminals 921, 931, and 941 serving as the first attaching portion and the connection terminals 951, 961, and 971 serving as the second attaching portion) of the support unit 9 and the package 5 (the base 6). Thus, it is possible to provide the gyro sensor 1 with high connection reliability.

MODIFICATION EXAMPLES

Figure 9:
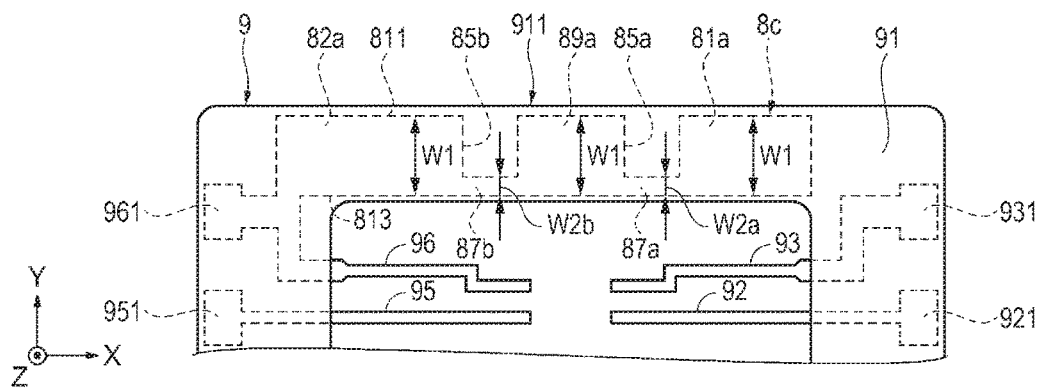
FIG. 9 is a plan view (top view) illustrating Modification Example 1 of a support unit.
Figure 10:
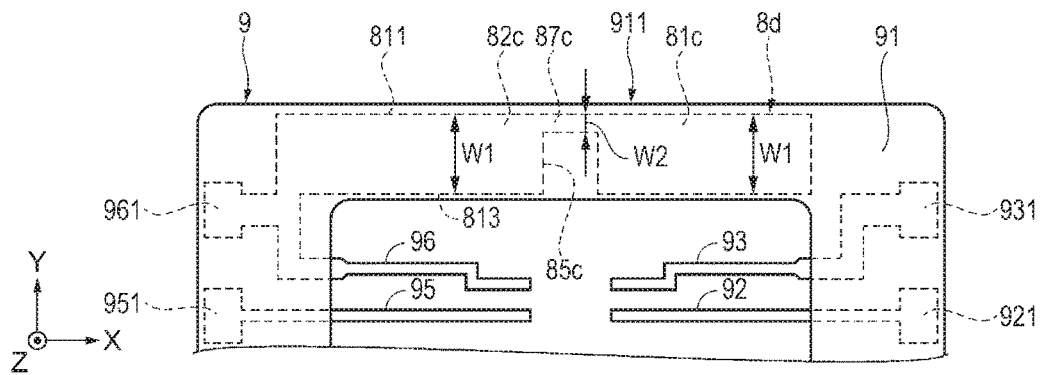
FIG. 10 is a plan view (top view) illustrating Modification Example 2 of the support unit.
Figure 11:
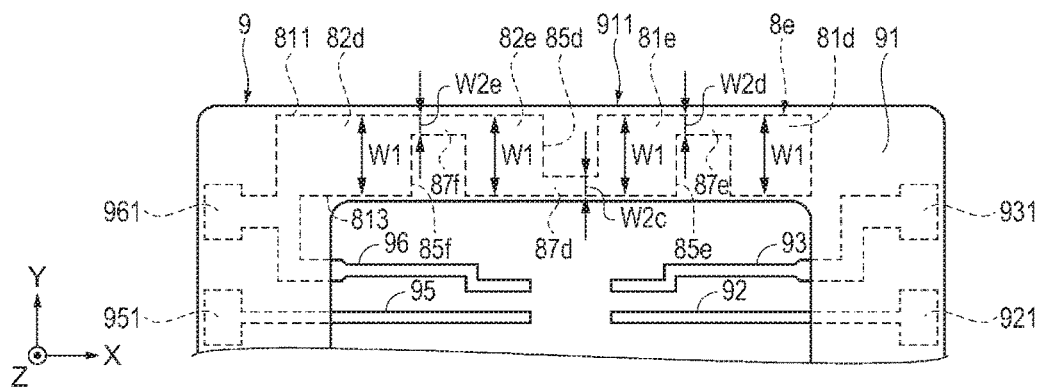
FIG. 11 is a plan view (top view) illustrating Modification Example 3 of the support unit.
Figure 12:
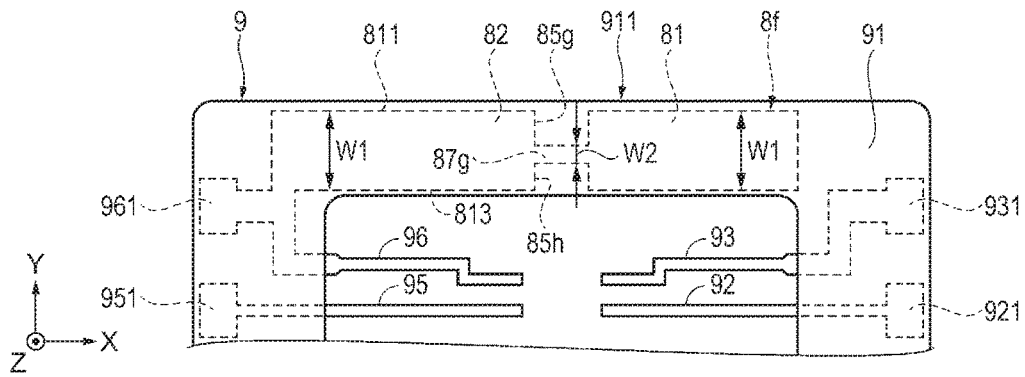
FIG. 12 is a plan view (top view) illustrating Modification Example 4 of the support unit.
Figure 13:
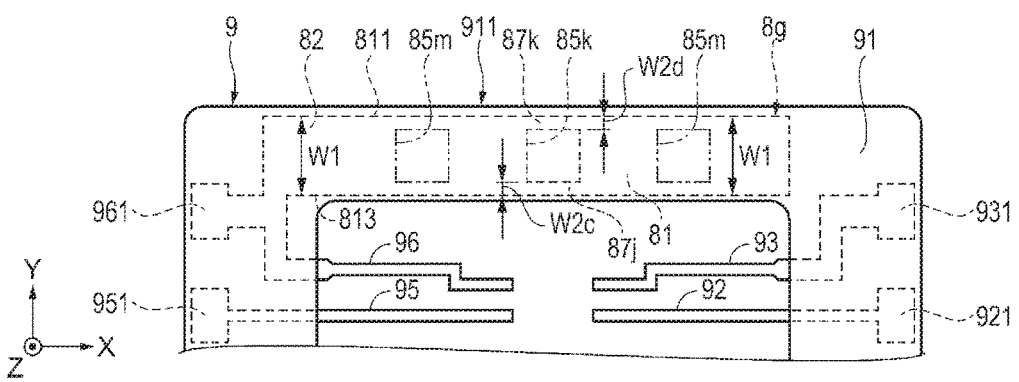
FIG. 13 is a plan view (top view) illustrating Modification Example 5 of the support unit.
Figure 14:
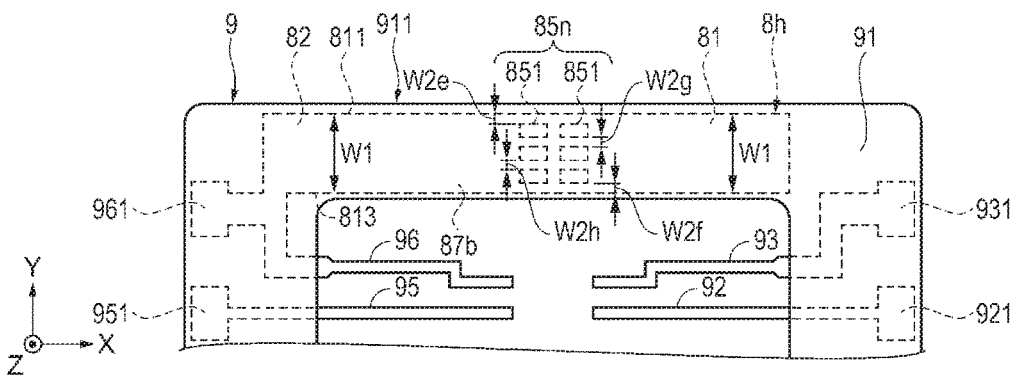
FIG. 14 is a plan view (top view) illustrating Modification Example 6 of the support unit.
Figure 15:
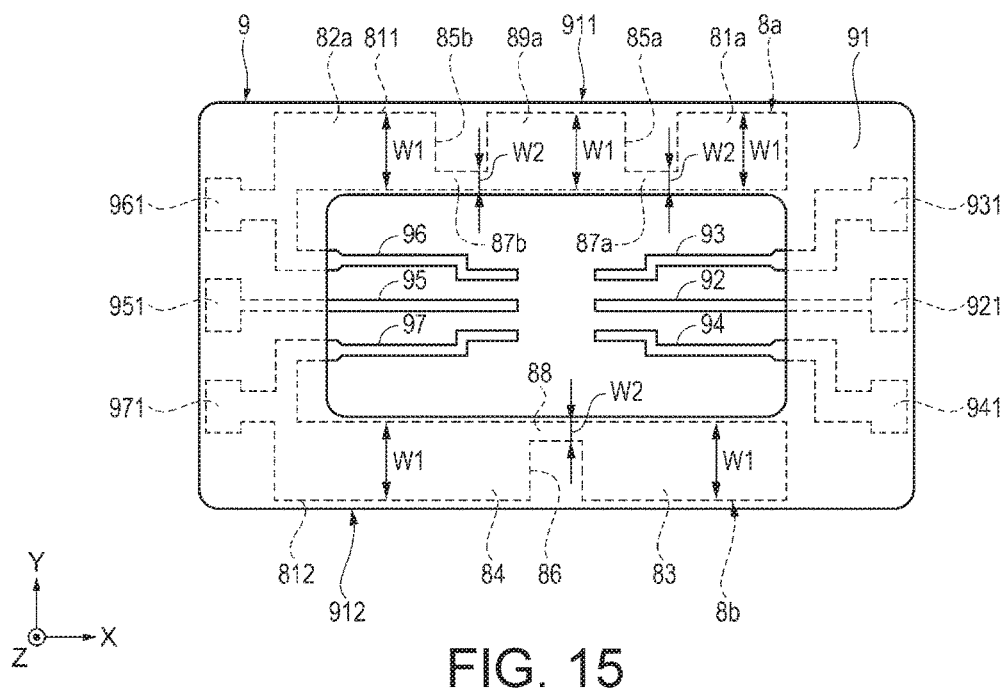
FIG. 15 is a plan view (top view) illustrating Modification Example 7 of the support unit.

Next, modification examples of the support unit 9 of the gyro sensor 1 according to the above-described first embodiment will be described with reference to FIGS. 9 to 15. Here, FIGS. 9 to 14 are plan views (top views) illustrating Modification Examples 1 to 6 of the support unit. FIG. 9 illustrates Modification Example 1, FIG. 10 illustrates Modification Example 2, FIG. 11 illustrates Modification Example 3, FIG. 12 illustrates Modification Example 4, FIG. 13 illustrates Modification Example 5, and FIG. 14 illustrates Modification Example 6. FIGS. 9 to 14 are diagrams illustrating the support unit 9 when partially viewed in a plan view, and the support unit 9 has the same configuration on the opposite side via the support leads 92, 93, 94, 95, 96, and 97. FIG. 15 is a plan view (top view) illustrating Modification Example 7 of the support unit. In the following description, the same reference numerals are given to the same configurations as those of the above-described first embodiment and the description thereof will be omitted or simplified.

MODIFICATION EXAMPLE 1 OF SUPPORT UNIT

Modification Example 1 of the support unit 9 will be described with reference to FIG. 9. As illustrated in FIG. 9, the support unit 9 according to Modification Example 1 includes a frame-shaped substrate (support substrate) 91, six support leads 92, 93, 94, 95, 96, and 97 (where the support leads 94 and 97 are not illustrated) formed in the substrate 91, and a shield portion 8c, as in the first embodiment.

The shield portion 8c extends from the connection terminal 961. The shield portion 8c is stacked (fixed) on the lower surface of the middle portion 911 located on both sides in the Y axis direction between the first and second attaching portions in the frame-shaped substrate 91. The shield portion 8c extends to substantially imitate the planar shape of the middle portion 911 extending from the connection terminal 961.

The shield portion 8c includes three broad width portions (a first broad width portion 81a, a second broad width portion 82a, and a third broad width portion 89a) with the width W1 which is a width dimension (dimension in the Y axis direction) which is substantially the same as the width of the middle portion 911 and two narrow width portions (a first narrow width portion 87a and a second narrow width portion 87b) interposed the broad width portions.

The narrow width portion includes the first narrow width portion 87a located between the first broad width portion 81a and the third broad width portion 89a and the second narrow width portion 87b located between the second broad width portion 82a and the third broad width portion 89a. The first narrow width portion 87a has a width W2a narrowed in a width dimension (dimension in the Y axis direction) by a concave portion 85a serving as a slit portion cut from an outer edge 811 of the shield portion 8c. The second narrow width portion 87b has a width W2b narrowed in a width dimension (dimension in the Y axis direction) by a concave portion 85b serving as a slit portion cut from the outer edge 811 of the shield portion 8c. The width W2a of the first narrow width portion 87a and the width W2b of the second narrow width portion 87b may be the same or may be different.

MODIFICATION EXAMPLE 2 OF SUPPORT UNIT

First, Modification Example 2 of the support unit 9 will be described with reference to FIG. 10. As illustrated in FIG. 10, the support unit 9 according to Modification Example 2 includes a frame-shaped substrate (support substrate) 91, six support leads 92, 93, 94, 95, 96, and 97 (where the support leads 94 and 97 are not illustrated) formed in the substrate 91, and a shield portion 8d as in the first embodiment.

The shield portion 8d extends from the connection terminal 961. The shield portion 8d is stacked (fixed) on the lower surface of the middle portion 911 located on both sides in the Y axis direction between the first and second attaching portions in the frame-shaped substrate 91. The shield portion 8d extends to substantially imitate the planar shape of the middle portion 911 extending from the connection terminal 961.

The shield portion 8d includes two broad width portions (a first broad width portion 81c and a second broad width portion 82c) with the width W1 which is a width dimension (dimension in the Y axis direction) which is substantially the same as the width of the middle portion 911 and a narrow width portion 87c that has a width W2 narrowed in a width dimension (dimension in the Y axis direction) by a concave portion 85c serving as a slit portion cut from the inner circumferential edge 813 of the shield portion 8d and is interposed the first broad width portion 81c and the second broad width portion 82c. As in the modification example, the narrow width portion 87c with the width W2 narrowed in the width dimension (dimension in the Y axis direction) has the same advantages as those of the first embodiment even in a configuration formed on the outer edge 811 of the shield portion 8d.

MODIFICATION EXAMPLE 3 OF SUPPORT UNIT

First, Modification Example 3 of the support unit 9 will be described with reference to FIG. 11. As illustrated in FIG. 11, the support unit 9 according to Modification Example 3 includes a frame-shaped substrate (support substrate) 91, six support leads 92, 93, 94, 95, 96, and 97 (where the support leads 94 and 97 are not illustrated) formed in the substrate 91, and a shield portion 8e, as in the first embodiment.

The shield portion 8e extends from the connection terminal 961. The shield portion 8e is stacked (fixed) on the lower surface of the middle portion 911 located on both sides in the Y axis direction between the first and second attaching portions in the frame-shaped substrate 91. The shield portion 8e extends to substantially imitate the planar shape of the middle portion 911 extending from the connection terminal 961.

The shield portion 8e includes four broad width portions (a first broad width portion 81d, a second broad width portion 82d, a third broad width portion 81e, and a fourth broad width portion 82e) with the width W1 which is a width dimension (dimension in the Y axis direction) which is substantially the same as the width of the middle portion 911 and three narrow width portions (a first narrow width portion 87e, a second narrow width portion 87d, and a third narrow width portion 87f) interposed the broad width portions.

The narrow width portion includes the first narrow width portion 87e located between the first broad width portion 81d and the third broad width portion 81e, the second narrow width portion 87d located between the third broad width portion 81e and the fourth broad width portion 82e, and the third narrow width portion 87f located between the fourth broad width portion 82e and the second broad width portion 82d.

The first narrow width portion 87e has a width W2d narrowed in a width dimension (dimension in the Y axis direction) by a concave portion 85e serving as a slit portion cut from the inner circumferential edge 813 of the shield portion 8e. Similarly, the third narrow width portion 87f has a width W2e narrowed in a width dimension (dimension in the Y axis direction) by a concave portion 85f serving as a slit portion cut from the inner circumferential edge 813 of the shield portion 8e. The second narrow width portion 87d has a width W2c narrowed in a width dimension (dimension in the Y axis direction) by a concave portion 85d serving as a slit portion cut from the outer edge 811 of the shield portion 8e. Thus, even when the side on which the concave portion is cut in the narrow width portion is configured to be the side of the inner circumferential edge 813 of the shield portion 8e or the side of the outer edge 811 of the shield portion 8e, the same advantages as those of the first embodiment are obtained.

The cut direction or the disposition in the cut direction does not matter. The width W2d of the first narrow width portion 87e, the width W2c of the second narrow width portion 87d, and the width W2e of the third narrow width portion 87f may be the same or may be different.

MODIFICATION EXAMPLE 4 OF SUPPORT UNIT

First, Modification Example 4 of the support unit 9 will be described with reference to FIG. 12. As illustrated in FIG. 12, the support unit 9 according to Modification Example 4 includes a frame-shaped substrate (support substrate) 91, six support leads 92, 93, 94, 95, 96, and 97 (where the support leads 94 and 97 are not illustrated) formed in the substrate 91, and a shield portion 8f as in the first embodiment.

The shield portion 8f extends from the connection terminal 961. The shield portion 8f is stacked (fixed) on the lower surface of the middle portion 911 located on both sides in the Y axis direction between the first and second attaching portions in the frame-shaped substrate 91. The shield portion 8f extends to substantially imitate the planar shape of the middle portion 911 extending from the connection terminal 961.

The shield portion 8f includes two broad width portions (a first broad width portion 81 and a second broad width portion 82) with the width W1 which is a width dimension (dimension in the Y axis direction) which is substantially the same as the width of the middle portion 911 and a narrow width portion 87g interposed the first broad width portion 81 and the second broad width portion 82.

The narrow width portion 87g has a width W2 narrowed in a width dimension (dimension in the Y axis direction) by a concave portion 85g serving as a slit portion cut from the outer edge 811 of the shield portion 8f and a concave portion 85h serving as a slit portion cut from the inner circumferential edge 813 of the shield portion 8f. Thus, even in a configuration in which the slit portion is cut in a different direction, for example, a formed direction of the concave portion forming the narrow width portion is the side of the inner circumferential edge 813 or the outer edge 811 of the shield portion 8f, the same advantages as those of the first embodiment are obtained. A cut depth dimension (the depth of the concave portion) from the outer edge 811 of the concave portion 85g and a cut depth dimension (the depth of the concave portion) from the inner circumferential edge 813 of the concave portion 85h do not matter, may be the same or may be different. The dimension of the width W2 does not matter.

MODIFICATION EXAMPLE 5 OF SUPPORT UNIT

First, Modification Example 5 of the support unit 9 will be described with reference to FIG. 13. As illustrated in FIG. 13, the support unit 9 according to Modification Example 5 includes a frame-shaped substrate (support substrate) 91, six support leads 92, 93, 94, 95, 96, and 97 (where the support leads 94 and 97 are not illustrated) formed in the substrate 91, and a shield portion 8g as in the first embodiment.

The shield portion 8g extends from the connection terminal 961. The shield portion 8g is stacked (fixed) on the lower surface of the middle portion 911 located on both sides in the Y axis direction between the first and second attaching portions in the frame-shaped substrate 91. The shield portion 8g extends to substantially imitate the planar shape of the middle portion 911 extending from the connection terminal 961.

The shield portion 8g includes two broad width portions (a first broad width portion 81 and a second broad width portion 82) with the width W1 which is a width dimension (dimension in the Y axis direction) which is substantially the same as the width of the middle portion 911; and a first narrow width portion 87k and a second narrow width portion 87j included in a narrow width portion interposed the first broad width portion 81 and the second broad width portion 82.

The first narrow width portion 87k and the second narrow width portion 87j are formed by a substantially rectangular through hole 85k formed in the middle portion 911 of the shield portion 8g. Thus, the first narrow width portion 87k has a width W2d between the through hole 85k, and the outer edge 811 of the shield portion 8g and the second narrow width portion 87j has a width W2c between the through hole 85k and the inner circumferential edge 813 of the shield portion 8g. Even when the narrow width portion is configured by forming, for example, the through hole 85k in this way, the same advantages as those of the first embodiment are obtained.

The plurality of through holes 85k may be formed. For example, three through holes may be configured to be formed in addition to two through holes 85m, as indicated by an imaginary line (two-dot chain line) in the drawing. The shape of the through hole 85k is not limited to the rectangular shape. For example, another shape such as a circular shape, an elliptical shape, or a polygonal shape may be used. The width W2d of the first narrow width portion 87k and the width W2c of the second narrow width portion 87j may be the same or may be different.

MODIFICATION EXAMPLE 6 OF SUPPORT UNIT

First, Modification Example 6 of the support unit 9 will be described with reference to FIG. 14. As illustrated in FIG. 14, the support unit 9 according to Modification Example 6 includes a frame-shaped substrate (support substrate) 91, six support leads 92, 93, 94, 95, 96, and 97 (where the support leads 94 and 97 are not illustrated) formed in the substrate 91, and a shield portion 8h as in the first embodiment.

The shield portion 8h extends from the connection terminal 961. The shield portion 8h is stacked (fixed) on the lower surface of the middle portion 911 located on both sides in the Y axis direction between the first and second attaching portions in the frame-shaped substrate 91. The shield portion 8h extends to substantially imitate the planar shape of the middle portion 911 extending from the connection terminal 961.

The shield portion 8h includes two broad width portions (a first broad width portion 81 and a second broad width portion 82) with the width W1 which is a width dimension (dimension in the Y axis direction) which is substantially the same as the width of the middle portion 911 and a narrow width portion 85n interposed the first broad width portion 81 and the second broad width portion 82.

The narrow width portion 85n is configured such that a plurality of through holes 851 are arranged. Specifically, three through holes 851 are disposed to be arranged so that the intervals of the through holes 851 become a width W2g and W2h in the width direction (the Y axis direction) of the shield portion 8h. At this time, the narrow width portion 85n is disposed to include the narrow width portions with a width W2f which is an interval between the inner circumferential edge 813 and the inner through hole 851 and a width W2e which is an interval between the outer edge 811 and the outside through hole 851. In this example, the through holes are configured to be arranged in two columns. The number of through holes 851, the shape of the through holes 851, and the arrangement pattern do not matter. Thus, even when the narrow width portion 85n is formed by the plurality of through holes 851, the same advantages as those of the first embodiment are obtained.

MODIFICATION EXAMPLE 7 OF SUPPORT UNIT

First, Modification Example 7 of the support unit 9 will be described with reference to FIG. 15. As illustrated in FIG. 15, the support unit 9 according to Modification Example 7 includes a frame-shaped substrate (support substrate) 91, six support leads 92, 93, 94, 95, 96, and 97 formed in the substrate 91, and a shield portion 8a and a shield portion 8b, as in the first embodiment.

The shield portion 8a extends from the connection terminal 961. The shield portion 8b extends from the connection terminal 971. The shield portions 8a and 8b are stacked (fixed) on the lower surfaces of the middle portions 911 and 912 located on both sides in the Y axis direction between the first and second attaching portions in the frame-shaped substrate 91. The shield portions 8a and 8b extend to substantially imitate the planar shapes of the middle portions 911 and 912 extending from the connection terminals 961 and 971.

The shield portion 8a includes three broad width portions (a first broad width portion 81a, a second broad width portion 82a, and a third broad width portion 89a) with the width W1 which is a width dimension (dimension in the Y axis direction) which is substantially the same as the width of the middle portion 911 and two narrow width portions (a first narrow width portion 87a and a second narrow width portion 87b) interposed the broad width portions.

The narrow width portion includes the first narrow width portion 87a located between the first broad width portion 81a and the third broad width portion 89a and the second narrow width portion 87b located between the second broad width portion 82a and the third broad width portion 89a. The first narrow width portion 87a has the width W2 narrowed in a width dimension (dimension in the Y axis direction) by a concave portion 85a serving as a slit portion cut from an outer edge 811 of the shield portion 8a. The second narrow width portion 87b has the width W2 narrowed in a width dimension (dimension in the Y axis direction) by a concave portion 85b serving as a slit portion cut from the outer edge 811 of the shield portion 8a. The width W2 of the first narrow width portion 87a and the width W2 of the second narrow width portion 87b may be the same or may be different.

The shield portion 8b includes two broad width portions (a first broad width portion 83 and a second broad width portion 84) with the width W1 which is a width dimension (dimension in the Y axis direction) which is substantially the same as the width of the middle portion 912 and a narrow width portion 88 interposed the first broad width portion 83 and the second broad width portion 84. The narrow width portion 88 has the width W2 narrowed in a width dimension (dimension in the Y axis direction) by a concave portion 86 serving as a slit portion cut from the outer edge 812 of the shield portion 8b.

According to Modification Example 7, the dispositions of the broad width portions and the narrow width portions are different in the shield portions 8a and 8b. With such a configuration, the same advantages as those of the first embodiment are obtained.

In the gyro sensor 1 according to Modification Examples 1 to 7 of the above-described support unit 9, the same advantages as those of the gyro sensor 1 according to the first embodiment can be obtained. That is, the rigidity of the shield portions 8c, 8d, 8e, 8f, 8g, 8h, 8a, and 8b is weakened by the narrow width portions 87a, 87b, 87c, 87d, 87e, 87f, 87g, 87k, 85n, and 88 with the respectively formed width dimensions, and thus it is possible to improve the absorption effect of stress occurring due to a difference in an expansion or contraction amount of each member in accordance with a change in environment temperature. Accordingly, it is possible to suppress a reduction in the connection strength of the attaching portions (the connection terminals 921, 931, and 941 serving as the first attaching portion and the connection terminals 951, 961, and 971 serving as the second attaching portion (see FIG. 3)) of the package 5 (the base 6) and the support unit 9, and thus it is possible to improve connection reliability of the gyro sensor 1.

SECOND EMBODIMENT

Figure 16:
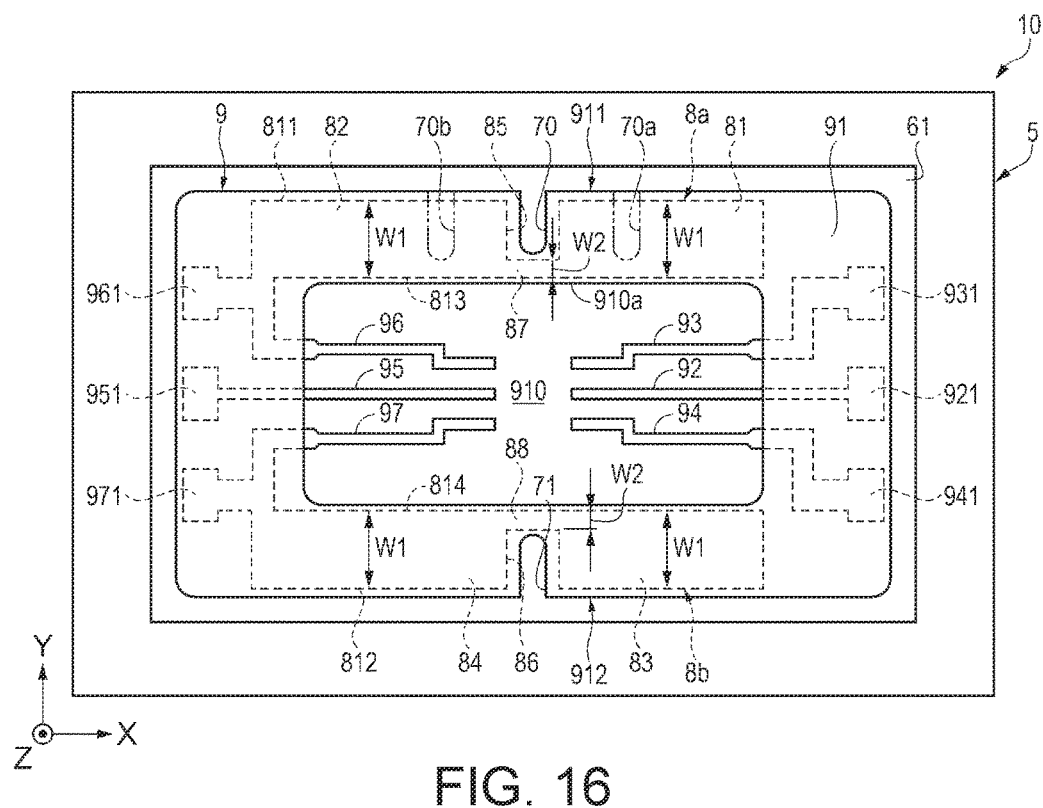
FIG. 16 is a plan view (top view) illustrating a gyro sensor according to a second embodiment.

Next, the configuration of a gyro sensor exemplified as an electronic device according to the invention according to a second embodiment will be described with reference to FIG. 16. FIG. 16 is a plan view (top view) illustrating the gyro sensor exemplified as an electronic device according to the invention according to the second embodiment. Hereinafter, the gyro sensor exemplified as an electronic device according to the invention according to the second embodiment will be described. Differences from the above-described embodiment will be mainly described. The same reference numerals are given to the same configurations or factors and the description thereof will be omitted. In the second embodiment, configurations are substantially the same as those of the above-described first embodiment except that the configuration of a middle portion of a support unit is different.

As illustrated in FIG. 16, as in the first embodiment, a gyro sensor 10 according to the second embodiment includes the gyro element 2 (see FIG. 1) that functions as a functional element detecting an angular velocity, the support unit 9 that supports the gyro element 2, and the package 5 that collectively accommodates the gyro element 2 and the support unit 9. As will be described below, the package 5 includes the base (substrate) 6 and the lid (lid body) 7 (see FIG. 2) joined with the base 6. Hereinafter, the configuration of a middle portion of a support unit different from the first embodiment will be mainly described.

As in the first embodiment, the support unit 9 according to the second embodiment includes a substrate (support substrate) 91 with a frame shape, six support leads 92, 93, 94, 95, 96, and 97 formed in the substrate 91, and shield portions 8a and 8b. As in the first embodiment, the support unit 9 is a TAB mounting substrate with optical transparency and supports the gyro element 2.

The substrate 91 serving as a support substrate is formed of, for example, a resin with flexibility, such as polyimide. The substrate 91 has a substantially oblong exterior form formed in a frame shape including an opening 910 in the middle and is disposed inside a concave portion 61 so that the major axis of the substrate 91 is identical to the major axis of the package 5. The substrate 91 includes two middle portions 911 and 912 facing each other in an elongate direction (in the X axis direction in the drawing) of the substrate 91.

The shield portions 8a and 8b are patterns that have thin plate shapes with conductivity and are formed of a metal material, as in the connection terminals 961 and 971 of the support leads 96 and 97. For example, the shield portions 8a and 8b are formed of copper (Cu), a copper alloy, or the like. The shield portion 8a extends from the connection terminal 961. The shield portion 8b extends from the connection terminal 971. The shield portions 8a and 8b are stacked (fixed) on the lower surfaces of the middle portions 911 and 912 located on both sides in the Y axis direction between the first attaching portion (portion located in connection terminals 931, 941, and 951) and the second attaching port ion (the connection terminals 951, 961, and 971) in the X axis direction in the substrate 91 with the frame shape. The shield portions 8a and 8b extend to substantially imitate the planar shapes of the middle portions 911 and 912 extending from the connection terminals 961 and 971.

Specifically, the shield portion 8a is formed to extend from the connection terminal 961 to substantially imitate the planar shape of the middle portion 911 and is stacked (fixed) on the rear surface of the middle portion 911. The shield portion 8a includes a first broad width portion 81 and a second broad width portion 82 that are broad width portions with a width W1 which is a width dimension (dimension in the Y axis direction) which is substantially the same as the width of the middle portion 911; and a narrow width portion 87 that is located between the first broad width portion 81 and the second broad width portion 82 and has a width W2 which is narrowed in the width dimension (the dimension in the Y axis direction) by the concave portion 85 serving as a slit portion cut from the outer edge 811 of the shield portion 8a. In other words, the broad width portion includes the first broad width portion 81 formed on one side in a first direction (X axis direction) via the narrow width portion 87 and the second broad width portion 82 formed on the other side.

In the middle portion 911 of the substrate 91 facing the concave portion 85 of the shield portion 8a, a second concave portion 70 serving as a slit portion formed by cutting a resin such as polyimide from the outer circumferential edge is formed. That is, the concave portion 85 of the shield portion 8a and the second concave portion 70 formed by cutting the resin such as polyimide of the middle portion 911 are disposed to overlap in a plan view when viewed in the Z axis direction in the drawing.

Specifically, the shield portion 8b extends from the connection terminal 971 to substantially imitate the planar shape of the middle portion 912 and is fixed to the rear surface of the middle portion 912. The shield portion 8b includes a first broad width portion 83 and a second broad width portion 84 that are broad width portions with the width W1 which is a width dimension (dimension in the Y axis direction) which is substantially the same as the width of the middle portion 912; and a narrow width portion 88 that is located between the first broad width portion 83 and the second broad width portion 84 and has the width W2 which is narrowed in the width dimension (the dimension in the Y axis direction) by the concave portion 86 serving as a slit portion engraved from the outer edge 812 of the shield portion 8b. In other words, the broad width portion includes the first broad width portion 83 formed on one side in a first direction (X axis direction) via the narrow width portion 88 and the second broad width portion 84 formed on the other side.

In the middle portion 912 of the substrate 91 facing the concave portion 86 of the shield portion 8b, a second concave portion 71 serving as a slit portion formed by cutting a resin such as polyimide from the outer circumferential edge is formed. That is, the concave portion 86 of the shield portion 8b and the second concave portion 71 formed by cutting the resin such as polyimide of the middle portion 912 are disposed to overlap in the plan view when viewed in the Z axis direction in the drawing.

In such a configuration, rigidity of the shield portions 8a and 8b is weakened by the narrow width portions 87 and 88 formed between the connection terminals 921, 931, and 941 and the connection terminals 951, 961, and 971, and thus it is possible to absorb stress occurring due to a difference in an expansion or contraction amount of each member in accordance with a change in environment temperature. Additionally, by the concave portions 85 and 86 of the shield portions 8a and 8b and the second concave portions 70 and 71 serving as the slit portions disposed to overlap in the plan view when viewed in the Z axis direction in the drawing, in the middle portions 911 and 912 of the substrate 91 (the support unit 9), it is possible to reduce stress occurring in the first and second attaching portions in accordance with a growth occurring due to a difference in the thermal expansion coefficient or a difference in a contraction amount between the base 6 and the substrate 91 serving as the support substrate in a case in which environment temperature is changed. Accordingly, it is possible to suppress a reduction in the connection strength of the attaching portions (the first and second attaching portions) of the base and the support unit including the connection terminals 921, 931, and 941 and the connection terminals 951, 961, and 971, and thus it is possible to improve connection reliability.

In addition to the second concave portion 70 formed at the position overlapping the concave portion 85, as indicated by an imaginary line (one-dot chain line) in FIG. 16, second concave portions 70a and 70b can also be formed at positions not overlapping the concave portion 85. The number of second concave portions does not matter. The second concave portion may not be formed at the position overlapping the concave portion 85 and the second concave portion can also be formed only at a position not overlapping the concave portion 85.

Even in a configuration in which one or more through holes (holes) are formed in place of the second concave portions 70 and 71 serving as the slit portions, the same advantages are obtained.

THIRD EMBODIMENT

Figure 17:
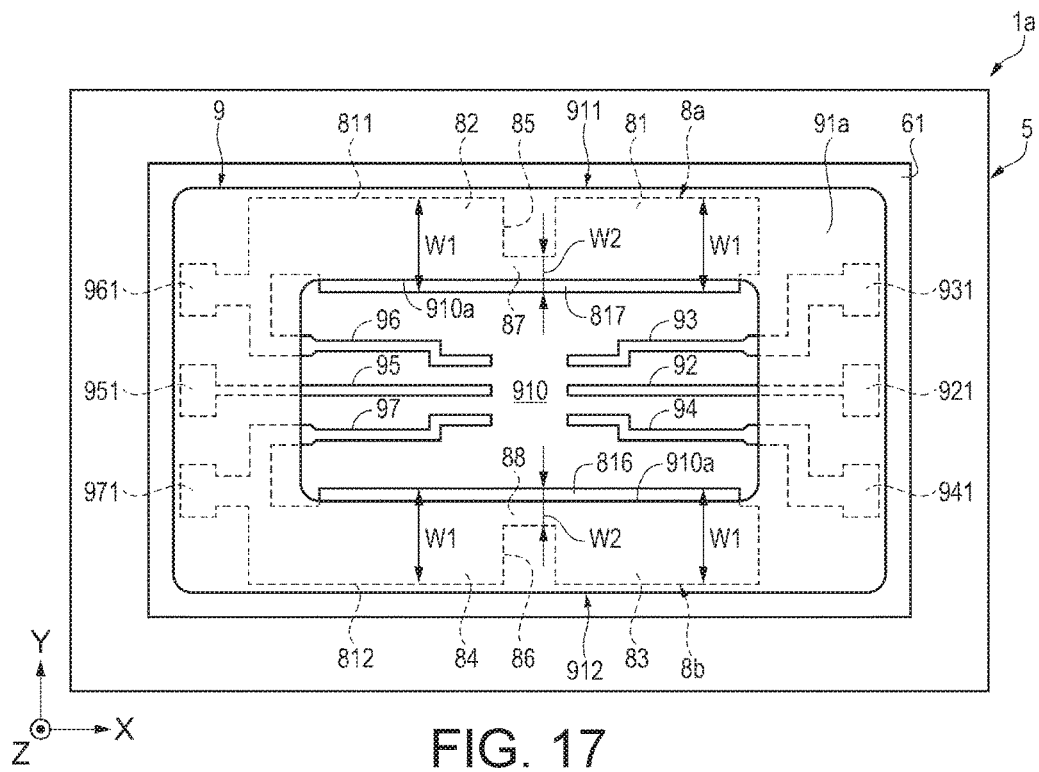
FIG. 17 is a plan view (top view) illustrating a gyro sensor according to a third embodiment.

Next, the configuration of a gyro sensor exemplified as an electronic device according to the invention according to a third embodiment will be described with reference to FIG. 17. FIG. 17 is a plan view (top view) illustrating the gyro sensor exemplified as an electronic device according to the invention according to the third embodiment. Hereinafter, the gyro sensor exemplified as an electronic device according to the invention according to the third embodiment will be described. Differences from the above-described first embodiment will be mainly described. The same reference numerals are given to the same configurations or factors and the description thereof will be omitted. In the third embodiment, configurations are substantially the same as those of the above-described first embodiment except that the configuration of a shield portion of a support unit is different.

As illustrated in FIG. 17, as in the first embodiment, a gyro sensor 1a according to the third embodiment includes the gyro element 2 (see FIG. 1) that functions as a functional element detecting an angular velocity, the support unit 9 that supports the gyro element 2, and the package 5 that collectively accommodates the gyro element 2 and the support unit 9. As will be described below, the package 5 includes the base (substrate) 6 and the lid (lid body) 7 (see FIG. 2) joined with the base 6. Hereinafter, the configuration of a middle portion of a support unit different from the first embodiment will be mainly described.

As in the first embodiment, the support unit 9 according to the third embodiment includes a substrate (support substrate) 91a with a frame shape, six support leads 92, 93, 94, 95, 96, and 97 formed in the substrate 91a, and shield portions 8a and 8b. As in the first embodiment, the support unit 9 is a TAB mounting substrate with optical transparency and supports the gyro element 2.

The substrate 91a serving as a support substrate is formed of, for example, a resin with flexibility, such as polyimide. The substrate 91a has a substantially oblong exterior form formed in a frame shape including an opening 910 in the middle and is disposed inside a concave portion 61 so that the major axis of the substrate 91a is identical to the major axis of the package 5. The substrate 91a includes two middle portions 911 and 912 facing each other in an elongate direction (in the X axis direction in the drawing) of the substrate 91a.

The shield portions 8a and 8b are patterns that have thin plate shapes with conductivity and are formed of a metal material, as in the connection terminals 961 and 971 of the support leads 96 and 97. For example, the shield portions 8a and 8b are formed of copper (Cu), a copper alloy, or the like. The shield portion 8a extends from the connection terminal 961. The shield portion 8b extends from the connection terminal 971. The shield portions 8a and 8b are stacked (fixed) on the lower surfaces of the middle portions 911 and 912 located on both sides in the Y axis direction between the first attaching portion (portion located in connection terminals 921, 931, and 941) and the second attaching portion (the connection terminals 951, 961, and 971) in the X axis direction in the substrate 91a with the frame shape. The shield portions 8a and 8b extend to substantially imitate the planar shapes of the middle portions 911 and 912 extending from the connection terminals 961 and 971.

Specifically, the shield portion 8a extends from the connection terminal 961 to substantially imitate the planar shape of the middle portion 911 and includes a protrusion 817 overhanging from an inner circumferential edge 910a of the substrate 91a of the support unit 9 in a flange shape in the opening 910 in the second direction (the Y axis direction). The shield portion 8a includes a first broad width portion 81 and a second broad width portion 82 that are broad width portions with a width W1 which is a width dimension (dimension in the Y axis direction) which is substantially the same as the width of the middle portion 911; and a narrow width portion 87 that is located between the first broad width portion 81 and the second broad width portion 82 and has a width W2 which is narrowed in the width dimension (the dimension in the Y axis direction) by the concave portion 85 serving as a slit portion cut from the outer edge 811 of the shield portion 8a. In other words, the broad width portion includes the first broad width portion 81 formed on one side in a first direction (X axis direction) via the narrow width portion 87 and the second broad width portion 82 formed on the other side.

The shield portion 8b extends from the connection terminal 971 to substantially imitate the planar shape of the middle portion 912 and includes a protrusion 816 overhanging from the inner circumferential edge 910a of the substrate 91a of the support unit 9 in the flange shape in the opening 910 in the second direction (the Y axis direction). The shield portion 8b includes a first broad width portion 83 and a second broad width portion 84 that are broad width portions with a width W1 which is a width dimension (dimension in the Y axis direction) which is substantially the same as the width of the middle portion 912; and a narrow width portion 88 that is located between the first broad width portion 83 and the second broad width portion 84 and has a width W2 which is narrowed in the width dimension (the dimension in the Y axis direction) by the concave portion 86 serving as a slit portion engraved from the outer edge 812 of the shield portion 8b. In other words, the broad width portion includes the first broad width portion 83 formed on one side in the first direction (X axis direction) via the narrow width portion 88 and the second broad width portion 84 formed on the other side.

The rigidity of the shield portions 8a and 8b is weakened by the narrow width portions 87 and 88 formed between the connection terminals 921, 931, and 941 and the connection terminals 951, 961, and 971, as described above, and thus it is possible to absorb stress occurring due to a difference in an expansion or contraction amount of each member in accordance with a change in environment temperature. Additionally, since the area of the shield portions is increased by the protrusions 816 and 817 overhanging from the inner circumferential edge 910a of the substrate 91a of the support unit 9 in the flange shape in the opening 910 in the second direction (the Y axis direction), it is possible to further improve a screening effect (shielding effect) of the electric noise (radiated noise). Since the shield portions are formed of metal, for example, it is possible to screen light such as ultraviolet rays or laser light.

In the middle portions 911 and 912 of the substrate 91a facing the concave portion 85 of the shield portion 8a and the concave portion 86 of the shield portion 8b, as in the above-described second embodiment, the second concave portions 70 and 71 (see FIG. 16) formed by cutting resin such as polyimide from the outer circumferential edge may be formed.

FOURTH EMBODIMENT

Figure 18:
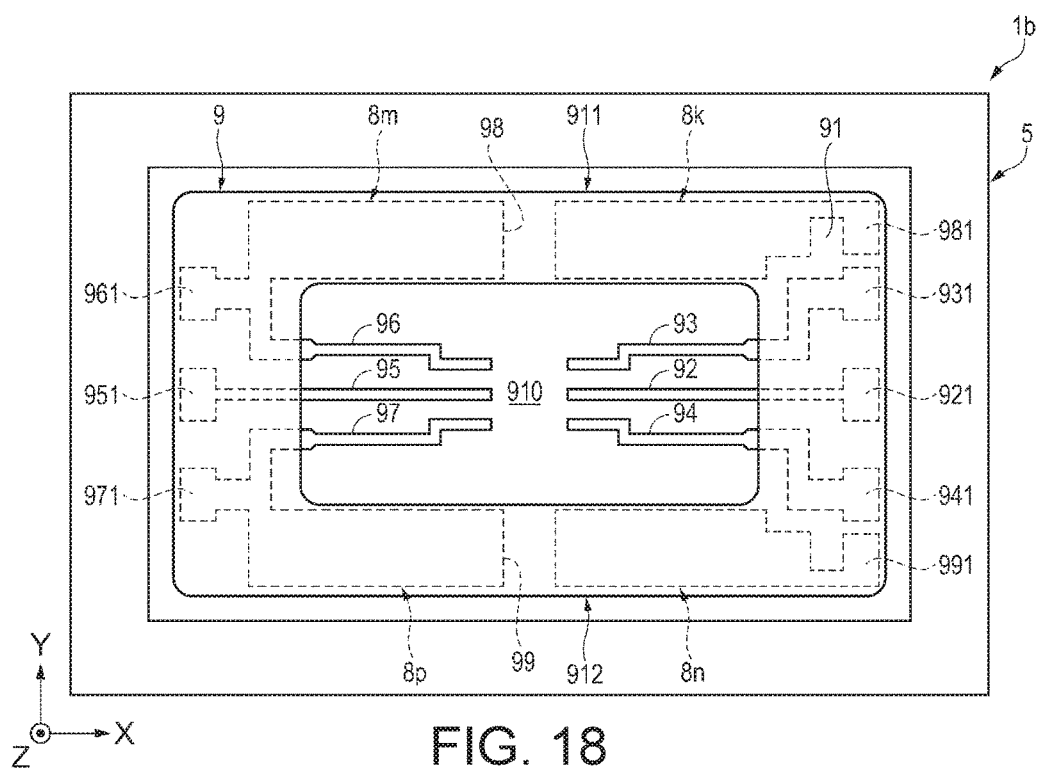
FIG. 18 is a plan view (top view) illustrating a gyro sensor according to a fourth embodiment.

Next, the configuration of a gyro sensor exemplified as an electronic device according to the invention according to a fourth embodiment will be described with reference to FIG. 18. FIG. 18 is a plan view (top view) illustrating the gyro sensor exemplified as an electronic device according to the invention according to the fourth embodiment. Hereinafter, the gyro sensor exemplified as an electronic device according to the invention according to the fourth embodiment will be described. Differences from the above-described first embodiment will be mainly described. The same reference numerals are given to the same configurations or factors and the description thereof will be omitted. In the fourth embodiment, configurations are substantially the same as those of the above-described first embodiment except that the configuration of a middle portion of a support unit is different.

As illustrated in FIG. 18, as in the first embodiment, a gyro sensor 1b according to the fourth embodiment includes the gyro element 2 (see FIG. 1) that functions as a functional element detecting an angular velocity, the support unit 9 that supports the gyro element 2, and the package 5 that collectively accommodates the gyro element 2 and the support unit 9. As will be described below, the package 5 includes the base (substrate) 6 and the lid (lid body) 7 (see FIG. 2) joined with the base 6. Hereinafter, the configuration of a middle portion of a support unit different from the first embodiment will be mainly described.

As in the first embodiment, the support unit 9 according to the fourth embodiment includes a substrate (support substrate) 91 with a frame shape, six support leads 92, 93, 94, 95, 96, and 97 formed in the substrate 91, first shield portions 8k, and 8n and second shield portions 8m and 8p included in a shield portion. As in the first embodiment, the support unit 9 is a TAB mounting substrate with optical transparency and supports the gyro element 2.

The substrate 91 serving as a support substrate is formed of, for example, a resin with flexibility, such as polyimide. The substrate 91 has a substantially oblong exterior form formed in a frame shape including an opening 910 in the middle and is disposed inside a concave portion of the package 5 so that the major axis of the substrate 91 is identical to the major axis of the package 5. The substrate 91 includes two middle portions 911 and 912 facing each other in an elongate direction (in the X axis direction in the drawing) of the substrate 91.

The first shield portions 8k and 8n and the second shield portions 8m and 8p included in the shield portion are patterns that have thin plate shapes with conductivity and are formed of a metal material, as in the connection terminals 961 and 971 and the connection terminals 981 and 991 of the support leads. For example, the shield portions are formed of copper (Cu), a copper alloy, or the like. One first shield portion 8k extends from the connection terminal 981 substantially in the first direction (the X axis direction) and the other first shield portion 8n extends from the connection terminal 991 substantially in the first direction (the X axis direction). One second shield portion 8m extends from the connection terminal 961 substantially in the first direction (the X axis direction) and the other second shield portion 8p extends from the connection terminal 971 substantially in the first direction (the X axis direction).

The first shield portions 8k and 8n and the second shield portions 8m and 8p are stacked (fixed) on the lower surfaces of the middle portions 911 and 912 located on both sides in the second direction (the Y axis direction) between the first attaching portion (portion located in connection terminals 921, 931, 941, 981 and 991) and the second attaching portion (the connection terminals 951, 961, and 971) in the first direction (the X axis direction) in the substrate 91 with the frame shape. The first shield portions 8k and 8n and the second shield portions 8m and 8p are disposed to be split (separated) from each other by split portions 98 and 99 formed in the middle portion of the middle portions 911 and 912 in the first direction (the X axis direction).

The first shield portions 8k and 8n and the second shield portions 8m and 8p preferably have, for example, fixed potentials such as the GND. Thus, by causing the first shield portions 8k and 8n and the second shield portions 8m and 8p to have the fixed potentials, for example, it is possible to efficiently screen (shield) of electric noise radiated from a digital signal terminal or the like.

According to the fourth embodiment, the shield portion formed between the first and second attaching portions disposed to be separated in the first direction (the X axis direction) is disposed to be split into the first shield portions 8k and 8n and the second shield portions 8m and 8p by the split portions 98 and 99. Accordingly, when environment temperature is changed, stress caused due to deformation of the shield portions with a large thermal expansion coefficient is absorbed by the split portions 98 and 99, and thus stress occurring in the first and second attaching portions can be reduced. Accordingly, it is possible to suppress a reduction in the connection strength of the attaching portions (the first and second attaching portions) of the base and the support unit.

FIFTH EMBODIMENT

Figure 19:
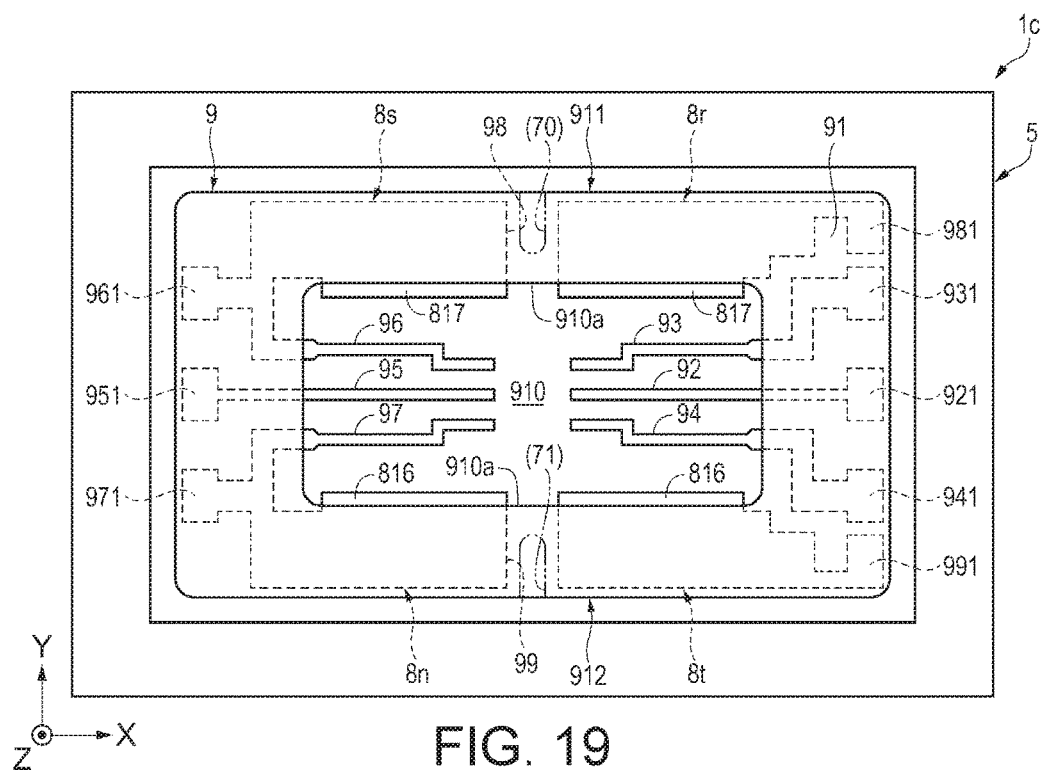
FIG. 19 is a plan view (top view) illustrating a gyro sensor according to a fifth embodiment.

Next, the configuration of a gyro sensor exemplified as an electronic device according to the invention according to a fifth embodiment will be described with reference to FIG. 19. FIG. 19 is a plan view (top view) illustrating the gyro sensor exemplified as an electronic device according to the invention according to the fifth embodiment. Hereinafter, the gyro sensor exemplified as an electronic device according to the invention according to the fifth embodiment will be described. Differences from the above-described fourth embodiment will be mainly described. The same reference numerals are given to the same configurations or factors and the description thereof will be omitted. In the fifth embodiment, configurations are substantially the same as those of the above-described fourth embodiment except that the configuration of a middle portion (shield portion) of a support unit is different.

As illustrated in FIG. 19, as in the first and fourth embodiments, a gyro sensor 1c according to the fifth embodiment includes the gyro element 2 (see FIG. 1) that functions as a functional element detecting an angular velocity, the support unit 9 that supports the gyro element 2, and the package 5 that collectively accommodates the gyro element 2 and the support unit 9. As will be described below, the package 5 includes the base (substrate) 6 and the lid (lid body) 7 (see FIG. 2) joined with the base 6. Hereinafter, the configuration of a middle portion of a support unit different from the first and fourth embodiments will be mainly described.

As in the fourth embodiment, the support unit 9 according to the fifth embodiment includes a substrate (support substrate) 91 with a frame shape, six support leads 92, 93, 94, 95, 96, and 97 formed in the substrate 91, first shield portions 8r, and 8t and second shield portions 8s and 8u included in a shield portion. As in the fourth embodiment, the support unit 9 is a TAB mounting substrate with optical transparency and supports the gyro element 2.

The substrate 91 serving as a support substrate is formed of, for example, a resin with flexibility, such as polyimide. The substrate 91 has a substantially oblong exterior form formed in a frame shape including an opening 910 in the middle and is disposed inside a concave portion of the package 5 so that the major axis of the substrate 91 is identical to the major axis of the package 5. The substrate 91 includes two middle portions 911 and 912 facing each other in an elongate direction (in the X axis direction in the drawing) of the substrate 91.

The first shield portions 8r and 8t and the second shield portions 8s and 8u included in the shield portion are patterns that have thin plate shapes with conductivity and are formed of a metal material, as in the connection terminals 961 and 971 and the connection terminals 981 and 991 of the support leads. For example, the shield portions are formed of copper (Cu), a copper alloy, or the like.

One first shield portion 8r extends from the connection terminal 981 substantially in the first direction (the X axis direction) and includes a protrusion 817 overhanging from the inner circumferential edge 910a of the substrate 91 of the support unit 9 in a flange shape in the opening 910 in the second direction (the Y axis direction). The other first shield portion 8t extends from the connection terminal 991 substantially in the first direction (the X axis direction) and includes a protrusion 816 overhanging from the inner circumferential edge 910a of the substrate 91 in a flange shape in the opening 910 in the second direction (the Y axis direction).

One second shield portion 8s extends from the connection terminal 961 substantially in the first direction (the X axis direction) and includes a protrusion 817 overhanging from the inner circumferential edge 910a of the substrate 91 in a flange shape in the opening 910 in the second direction (the Y axis direction). The other second shield portion 8u extends from the connection terminal 971 substantially in the first direction (the X axis direction) and includes a protrusion 816 overhanging from the inner circumferential edge 910a of the substrate 91 in a flange shape in the opening 910 in the second direction (the Y axis direction).

The first shield portions 8r and 8t and the second shield portions 8s and 8u are stacked (fixed) on the lower surfaces of the middle portions 911 and 912 located on both sides in the second direction (the Y axis direction) between the first attaching portion (portion located in connection terminals 921, 931, 941, 981 and 991) and the second attaching portion (the connection terminals 951, 961, and 971) in the first direction (the X axis direction) in the substrate 91 with the frame shape. The first shield portions 8r and 8t and the second shield portions 8s and 8u are disposed to be split (separated) from each other by split portions 98 and 99 formed in the middle portion of the middle portions 911 and 912 in the first direction (the X axis direction).

The first shield portions 8r and 8t and the second shield portions 8s and 8u have, for example, fixed potentials such as the GND. Thus, by causing the first shield portions 8r and 8t and the second shield portions 8s and 8u to have the fixed potentials, for example, it is possible to efficiently screen (shield) of electric noise radiated from a digital signal terminal or the like.

According to the fifth embodiment, the shield portion formed between the first and second attaching portions disposed to be separated in the first direction (the X axis direction) is split into the first shield portions 8r and 8t and the second shield portions 8s and 8u by the split portions 98 and 99. Accordingly, when environment temperature is changed, stress caused due to deformation of the shield portions with a large thermal expansion coefficient is absorbed by the split portions 98 and 99, and thus stress occurring in the first and second attaching portions can be reduced. Accordingly, it is possible to suppress a reduction in the connection strength of the attaching portions (the first and second attaching portions) of the base and the support unit.

Since the area of the shield portion is increased by the protrusions 816 and 817 overhanging from the inner circumferential edge 910a of the substrate (support substrate) 91 of the support unit 9 in the flange shape in the opening 910 in the second direction (the Y axis direction), it is possible to further improve the screening effect (shielding effect) of electric noise (radiated noise). Since the shield portion is formed of metal, for example, it is possible to screen light such as ultraviolet rays or laser light.

As indicated by an imaginary line (one-dot chain line) in FIG. 19, the second concave portions 70 and 71 cut from the outer circumferential edge can be formed in the substrate 91 of the support unit 9 at the position overlapping the split portions 98 and 99 in the plan view in which the shield portion is split.

Even in the fourth embodiment illustrated in FIG. 18 described above, the second concave portions 70 and 71 are formed. Thus, the same advantages can be obtained.

2. Electronic Apparatus

Next, an electronic apparatus to which the gyro sensor 1 serving as an electronic device is applied will be described in detail with reference to FIGS. 20 to 22.

Figure 20:
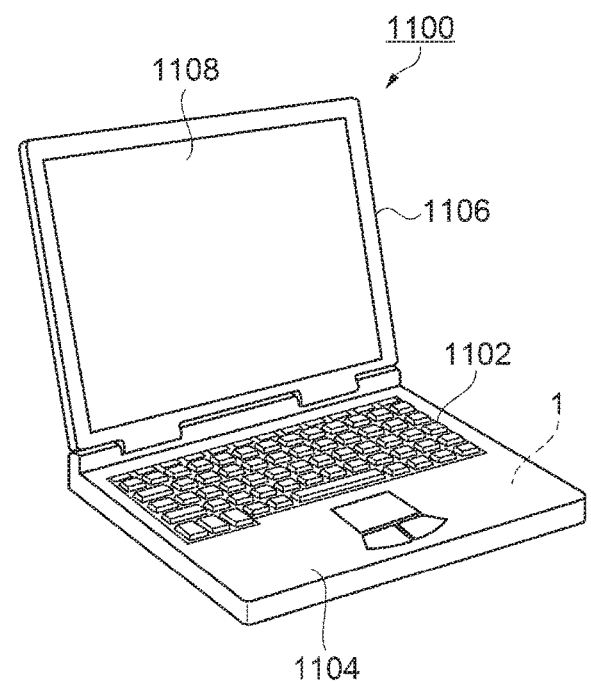
FIG. 20 is a perspective view illustrating the configuration of a mobile type (or notebook type) personal computer which is an electronic apparatus including the electronic device according to the invention.

FIG. 20 is a perspective view illustrating the configuration of a mobile type (or notebook type) personal computer to which an electronic apparatus including the electronic device according to the invention is applied. In the drawing, the personal computer 1100 is configured to include a body unit 1104 including a keyboard 1102 and a display unit 1106 including a display portion 1108. The display unit 1106 is supported to be rotated with a hinge structure unit interposed with the body unit 1104. In the personal computer 1100, the gyro sensor 1 functioning as an angular velocity detection section is included.

Figure 21:
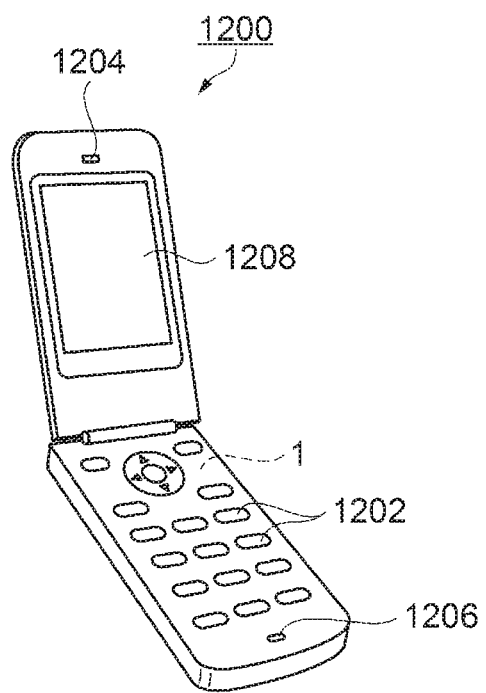
FIG. 21 is a perspective view illustrating the configuration of a mobile phone (including a PHS) which is an electronic apparatus including the electronic device according to the invention.

FIG. 21 is a perspective view illustrating the configuration of a mobile phone (including a PHS) to which an electronic apparatus including the electronic device according to the invention is applied. In the drawing, the mobile phone 1200 includes a plurality of operation buttons 1202, an earpiece 1204, and a mouthpiece 1206. A display unit 1208 is disposed between the operation buttons 1202 and the earpiece 1204. In the mobile phone 1200, the gyro sensor 1 functioning as an angular velocity detection section is included.

Figure 22:
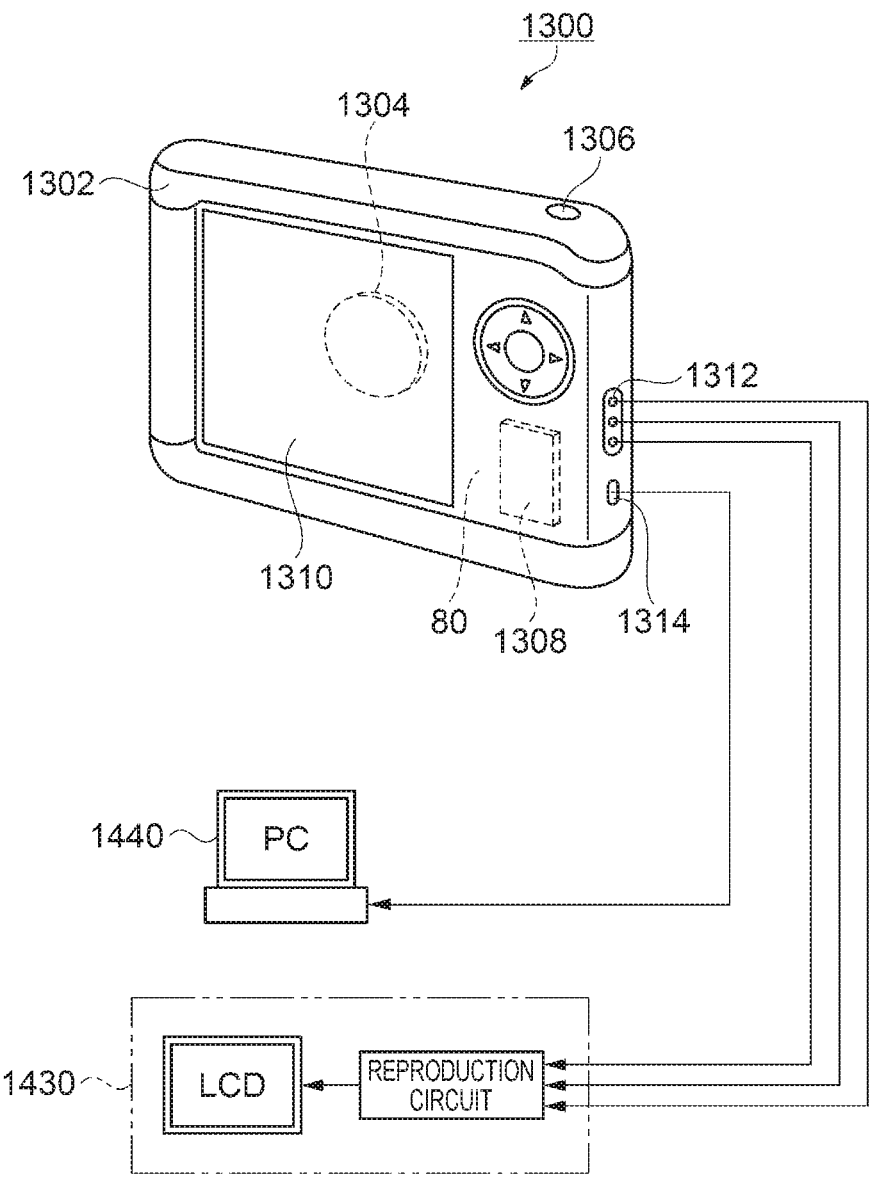
FIG. 22 is a perspective view illustrating the configuration of a digital still camera which is an electronic apparatus including the electronic device according to the invention.

FIG. 22 is a perspective view illustrating the configuration of a digital still camera to which an electronic apparatus including the electronic device according to the invention is applied. In the drawing, connection with an external apparatus is also simply illustrated. Here, a general camera exposes a silver-salt photo film by a light image of a subject, but the digital still camera 1300 performs photoelectric conversion on a light image of a subject using an image sensor such as a charge coupled device (CCD) and generates an imaging signal (image signal).

The digital still camera 1300 is configured such that a display unit is installed on the rear surface of a case (body) 1302 to perform display based on the imaging signal generated by the CCD. A display unit 1310 functions as a finder that displays a subject as an electronic image.

A light-receiving unit 1304 including an optical lens (imaging optical system) or a CCD is installed on the front surface (the rear surface side of the drawing) of the case 1302.

When a photographer confirms a subject image displayed on the display unit and presses a shutter button 1306, an imaging signal of the CCD at that time is transmitted and stored in a memory 1308.

In the digital still camera 1300, a video signal output terminal 1312 and a data communication input/output terminal 1314 are provided on a side surface of the case 1302. As illustrated, a television monitor 1430 is connected to the video signal output terminal 1312 and a personal computer 1440 is connected to the data communication input/output terminal 1314, as necessary. The imaging signal stored in the memory 1308 is configured to be output to the television monitor 1430 or the personal computer 1440 through a predetermined operation.

Since the digital still camera 1300 includes the gyro sensor 1 functioning as an angular velocity detection section.

The electronic apparatus including the electronic device according to the invention can be applied not only to the personal computer (mobile personal computer) in FIG. 20, the mobile phone in FIG. 21, and the digital still camera in FIG. 22, but can also be applied to, for example, an ink jet ejection apparatus (for example, an ink jet printer), a laptop personal computer, a television, a video camera, a video tape recorder, a car navigation apparatus, a pager, an electronic organizer (also including a communication function unit), an electronic dictionary, a calculator, an electronic game apparatus, a word processor, a workstation, a television phone, a security television monitor, electronic binoculars, a POS terminal, medical apparatuses (for example, an electronic thermometer, a blood pressure meter, a blood-sugar meter, an electrocardiographic apparatus, an ultrasonic diagnostic apparatus, and an electronic endoscope), a fish finder, various measurement apparatuses, meters (for example, meters for vehicles, airplanes, and ships), and a flight simulator.

3. Moving Object

Next, a moving object to which the gyro sensor 1 serving as a physical quantity sensor is applied will be described in detail with reference to FIG. 23.

Figure 23:
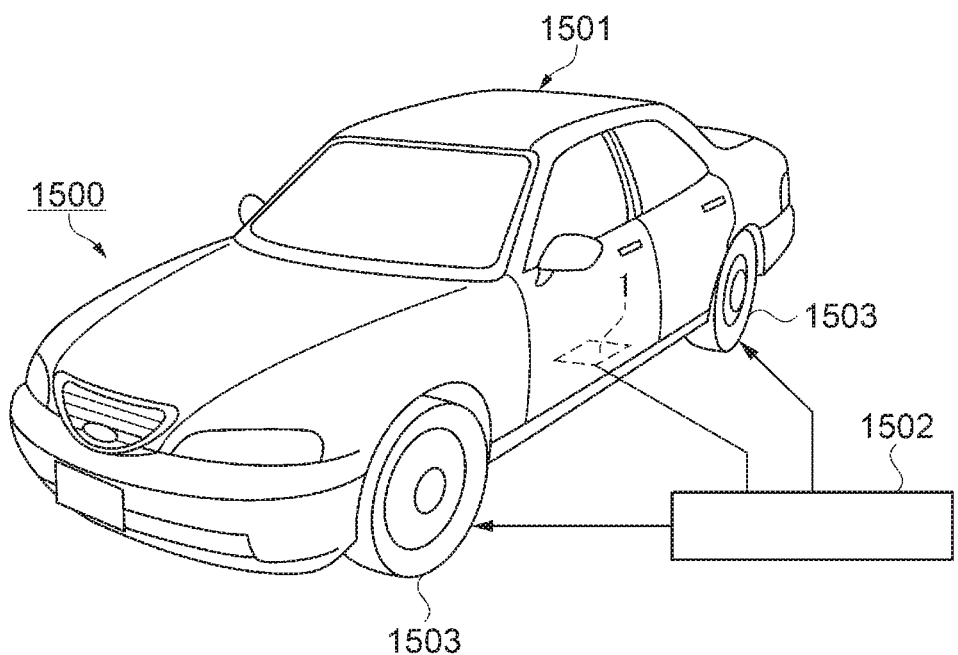
FIG. 23 is a perspective view illustrating the configuration of a moving object (automobile) including the electronic device according to the invention.

FIG. 23 is a perspective view illustrating the configuration of an automobile to which a moving object including the electronic device according to the invention is applied. An automobile 1500 includes the gyro sensor 1 that functions as an angular velocity detection section, and thus a posture of a body 1501 can be detected by the gyro sensor 1. A signal from the gyro sensor 1 is supplied to a body posture control device 1502. The body posture control device 1502 can detect a posture of the body 1501 based on the signal, and can control hardness and softness of a suspension according to a detection result or control of a brake of individual wheels 1503. In addition, the posture control can be used for a bipedal walking robot or a radio controlled helicopter. As described above, posture control of various moving objects is realized and the gyro sensor 1 is embedded.

The electronic device, the electronic apparatus, and the moving object according to the invention have been described according to the embodiments illustrated in the drawings, but the invention is not limited thereto. The configuration of each unit can be substituted with any configuration having the same function. Any other constituent element may be added to the invention.

The entire disclosure of Japanese Patent Application No. 2015-141925, filed Jul. 16, 2015 is expressly incorporated by reference herein.

What is claimed is:

1. An electronic device comprising:
   a base;
   a support member having a first attaching area and a second attaching area, the first and second attaching areas being separated from each other in a first direction, the supporting member having a middle area connecting the first attaching area to the second attaching area, the support member being attached to the base via the first and second attaching areas; and
   a functional element that is supported by the support member,
   wherein the middle area has a conductive pattern formed thereon, and
   wherein the conductive pattern includes a broad width portion having a width W1 in a second direction orthogonal to the first direction and a narrow width portion having a width W2, and the width W2 is narrower than the width W1.

2. The electronic device according to claim 1,
   wherein the support member is configured with a support substrate,
   wherein the conductive pattern is stacked on the support substrate, and
   wherein the conductive pattern has at least one of a slit and an opening,
   when the conductive pattern has the slit, the slit is formed to cut the conductive pattern from an outer circumferential edge of the conductive pattern in a plan view, and a cutting direction of the slit extends along the second direction in the plan view, and
   when the conductive pattern has the opening, the opening is formed inside of the conductive pattern in the plan view so that the opening is completely surround by the conductive pattern in the plan view.

3. The electronic device according to claim 2,
   wherein the conductive pattern includes a protrusion overhanging from a periphery of the support substrate along the second direction in the plan view.

4. An electronic apparatus comprising:
   the electronic device according to claim 2; and
   a display that displays an image.

5. A moving object comprising:
   the electronic device according to claim 2; and
   a moveable body that houses the electronic device.

6. The electronic device according to claim 1,
   wherein the broad width portion is configured with a first broad width portion and a second broad width portion, the first and second broad width portions are connected via the narrow width portion, and
   the first and second broad width portions and the narrow width portion are arranged in the first direction.

7. An electronic apparatus comprising:
   the electronic device according to claim 6; and
   a display that displays an image.

8. A moving object comprising:
   the electronic device according to claim 6; and
   a movable body that houses the electronic device.

9. The electronic device according to claim 1,
   wherein the conductive pattern is connected to a fixed potential.

10. An electronic apparatus comprising:
    the electronic device according to claim 9; and
    a display that displays an image.

11. A moving object comprising:
    the electronic device according to claim 9; and
    a movable body that houses the electronic device.

12. The electronic device according to claim 1,
    wherein the functional element includes a detection electrode that is configured to detect a physical quantity, and
    wherein the conductive pattern overlaps at least a part of the detection electrode in the plan view.

13. An electronic apparatus comprising:
    the electronic device according to claim 12; and
    a display that displays an image.

14. A moving object comprising:
    the electronic device according to claim 12; and
    a movable body that houses the electronic device.

15. The electronic device according to claim 1,
wherein the functional element is a gyro element including a detection electrode, the detection electrode is configured to detect an angular velocity, and
wherein the conductive pattern overlaps at least a part of the detection electrode in the plan view.

16. An electronic apparatus comprising:
the electronic device according to claim 15; and
a display that displays an image.

17. A moving object comprising:
the electronic device according to claim 15; and
a movable body that houses the electronic device.

18. An electronic apparatus comprising:
the electronic device according to claim 1; and
a display that displays an image.

19. A moving object comprising:
the electronic device according to claim 1; and
a movable bode that houses the electronic device.

20. An electronic device comprising:
a base;
a support substrate that is rectangular-ring-shaped having first, second, third, and fourth sides, the support substrate having:
a first area that is located at the first side;
a second area that is located at the second side opposite to the first side in a first direction;
a middle area that is respectively located at the third and fourth sides opposite to each other;
an opening that is provided at a center of the support substrate and that is enclosed by the first, second, third, and fourth sides; and
a conductive pattern that is disposed on the middle area; and
a functional element that is supported by the support substrate,
wherein the conductive pattern is configured with a first conductive pattern and a second conductive pattern, the second conductive pattern being physically separated from the first conductive pattern in a plan view,
the support substrate is attached to the base via the first and second areas, and
the first conductive pattern and the second conductive patterns are arranged in the first direction.

* * * * *